US011144585B1

(12) United States Patent
Knas et al.

(10) Patent No.: US 11,144,585 B1
(45) Date of Patent: *Oct. 12, 2021

(54) INTELLIGENT AND CONTEXT AWARE READING SYSTEMS

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 40 days.

This patent is subject to a terminal disclaimer.

(21) Appl. No.: 16/508,209

(22) Filed: Jul. 10, 2019

Related U.S. Application Data

(63) Continuation of application No. 15/466,410, filed on Mar. 22, 2017, now Pat. No. 10,360,254.

(60) Provisional application No. 62/312,519, filed on Mar. 24, 2016.

(51) Int. Cl.
| | | |
|---|---|---|
| *G06F 7/00* | (2006.01) | |
| *G06F 16/00* | (2019.01) | |
| *G06F 16/435* | (2019.01) | |
| *G06F 3/01* | (2006.01) | |
| *G06F 16/438* | (2019.01) | |

(52) U.S. Cl.
CPC ............ *G06F 16/437* (2019.01); *G06F 3/011* (2013.01); *G06F 16/438* (2019.01)

(58) Field of Classification Search
None
See application file for complete search history.

(56) References Cited

U.S. PATENT DOCUMENTS

| | | |
|---|---|---|
| 7,786,975 B2 | 8/2010 | Ording et al. |
| 9,336,259 B1 | 5/2016 | Kane |
| 9,734,135 B2 | 8/2017 | Swinehart et al. |
| 10,051,113 B1 | 8/2018 | Knas et al. |
| 10,306,311 B1 | 5/2019 | Knas et al. |
| 2002/0115436 A1 | 8/2002 | Howell et al. |
| 2003/0236622 A1 | 12/2003 | Schofield |
| 2004/0141636 A1 | 7/2004 | Liang et al. |
| 2005/0088291 A1 | 4/2005 | Blanco et al. |
| 2006/0256133 A1 | 11/2006 | Rosenberg |
| 2007/0006098 A1 | 1/2007 | Krumm et al. |

(Continued)

OTHER PUBLICATIONS

Oscar de Brujin et al., "Rapid Serial Visual Presentation: A space-time trade-off in information presentation", Imperial College of Science, Technology & Medicine. Department of Electrical and Electronic Engineering, 2000.

*Primary Examiner* — Tuan A Pham
(74) *Attorney, Agent, or Firm* — Foley & Lardner LLP

(57) ABSTRACT

Methods and systems for supplying content to a user including generating, configuring content data for presentation on a display of a user computing device, transmitting the content data to the display of the user computing device for display on the user computing device, collecting, behavior data of the user sensed by the tracking module, generating engagement data based on the collected behavior data, determining supplemental content configured for presentation on a display of the user computing device and displaying the supplemental content to the user on the user computing device.

12 Claims, 8 Drawing Sheets

(56) References Cited

U.S. PATENT DOCUMENTS

| | | |
|---|---|---|
| 2007/0117072 A1 | 5/2007 | Adjali et al. |
| 2008/0172261 A1 | 7/2008 | Albertson et al. |
| 2009/0006295 A1 | 1/2009 | Angell et al. |
| 2009/0119600 A1 | 5/2009 | O'Sullivan et al. |
| 2009/0133047 A1 | 5/2009 | Lee et al. |
| 2009/0221279 A1 | 9/2009 | Rutledge |
| 2010/0161409 A1 | 6/2010 | Ryu et al. |
| 2011/0093159 A1 | 4/2011 | Boling et al. |
| 2012/0256967 A1 | 10/2012 | Baldwin et al. |
| 2012/0265977 A1 | 10/2012 | Ewell, Jr. et al. |
| 2013/0040600 A1 | 2/2013 | Reitnour et al. |
| 2013/0063304 A1 | 3/2013 | O'Regan et al. |
| 2013/0150004 A1 | 6/2013 | Rosen |
| 2013/0238422 A1 | 9/2013 | Saldanha |
| 2013/0238425 A1 | 9/2013 | Saldanha et al. |
| 2014/0019167 A1 | 1/2014 | Cheng et al. |
| 2014/0045477 A1 | 2/2014 | Ewell, Jr. et al. |
| 2014/0063055 A1* | 3/2014 | Osterhout ............... G06F 3/165 345/633 |
| 2014/0089801 A1 | 3/2014 | Agrawal |
| 2014/0118140 A1 | 5/2014 | Amis |
| 2014/0210863 A1 | 7/2014 | Osaka |
| 2014/0359647 A1 | 12/2014 | Shoemake et al. |
| 2015/0086072 A1 | 3/2015 | Kompalli et al. |
| 2015/0099480 A1 | 4/2015 | Reiter |
| 2015/0205494 A1* | 7/2015 | Scott ................... G06F 3/04845 345/158 |
| 2015/0220814 A1* | 8/2015 | Verkasalo .......... G06Q 30/0201 382/103 |
| 2015/0223731 A1* | 8/2015 | Sahin ................... A61B 5/1123 600/301 |
| 2015/0234457 A1 | 8/2015 | Kempinski |
| 2015/0245084 A1 | 8/2015 | Downing et al. |
| 2015/0254596 A1 | 9/2015 | Nayar et al. |
| 2015/0338915 A1 | 11/2015 | Publicover et al. |
| 2015/0347903 A1 | 12/2015 | Saxena et al. |
| 2015/0370435 A1 | 12/2015 | Kirmse et al. |
| 2016/0132530 A1 | 5/2016 | Misu et al. |
| 2016/0162478 A1 | 6/2016 | Blassin et al. |
| 2016/0179192 A1 | 6/2016 | Wu |
| 2016/0189423 A1 | 6/2016 | Kaeser et al. |
| 2016/0225012 A1 | 8/2016 | Ha et al. |
| 2017/0039784 A1 | 2/2017 | Gelbart et al. |
| 2017/0188168 A1 | 6/2017 | Lyren et al. |
| 2017/0210288 A1 | 7/2017 | Briggs et al. |

* cited by examiner

INTELLIGENT AND CONTEXT AWARE READING SYSTEMS

CROSS-REFERENCE TO RELATED APPLICATIONS

This application is a continuation of U.S. patent application Ser. No. 15/466,410, filed Mar. 22, 2017, which claims the benefit of U.S. Provisional Application No. 62/312,519, filed on Mar. 24, 2016, each of which is incorporated herein by reference in its entirety.

This application is related to U.S. patent application Ser. No. 15/466,617, filed Mar. 22, 2017, U.S. patent application Ser. No. 15/466,445, filed Mar. 22, 2017, U.S. patent application Ser. No. 15/466,757, filed Mar. 22, 2017, and U.S. patent application Ser. No. 15/466,510, filed Mar. 22, 2017, all of which are incorporated by reference in their entirety.

FIELD OF THE DISCLOSURE

The present disclosure relates in general to systems and methods for displaying content, and more specifically to systems and methods for presenting content based on ocular, head, and expressive feedback.

BACKGROUND

People consume an ever increasing amount of text and other media daily. As such, numerous efforts have been undertaken to improve the tools at the disposal of readers when displaying content, especially tools to allow people to read more quickly while sustaining a high level of reading comprehension. Examples of such tools include speed reading techniques and Rapid Serial Visual Presentation (RSVP) text display techniques. Tools and techniques relating to Rapid Serial Visual Presentation are further described within de Bruijn, Oscar, and Robert Spence. "Rapid serial visual presentation: a space-time trade-off in information presentation." *Advanced visual interfaces.* 2000.

Though these and other efforts have attempted to provide people with better tools for the consumption of media, there is a general trade-off between comprehension and the ability to consume media quickly, access supplemental content and control displayed content. As such, there is a continuing need to develop techniques to improve comprehension and control displayed content.

As people use electronic devices to review content, content can be display in an automated manner, but such automated systems do not account for variations in a viewer's comprehension. It is desirable to have a system that can display the content to allow for the user to consume the content in an efficient manner, including dynamically adjusting for instances where the person has slowed or stopped consuming content, is distracted, or requires more information. It is also desirable to have a system that can permits a user to easily navigate and control the displayed content.

SUMMARY

Disclosed here are systems and methods for presenting content to a user. The methods may include displaying content to a user, tracking the head position, gaze and expression of the user to generate head engagement data, ocular engagement data and emotional state data, and determining if supplemental content is needed based on the head engagement data, ocular engagement data and emotional state data. The methods may include displaying supplemental content to a user that is associated with the displayed content.

In some embodiments, systems and methods for presenting supplemental content to a user include a user device, an external data source, and a communications network. In these embodiments, the user device further includes a communication module, an input/output module, a user interface, a tracking module, a tracking sensor module, and a content processing module.

In some embodiments there is a method comprising the steps of generating, by a content processing module of a server, content data configured for presentation on a display of a user computing device; transmitting, by the content processing module of the server, only the content data to the display of the user computing device for display on the user computing device; collecting, by a tracking module of the server, behavior data of a user sensed by a tracking sensor module in the user computing device while the user consumes the content data; automatically generating, by a tracking module, engagement data based on the collected behavior data; dynamically determining, by the content processing module of the server, that supplemental content data is to be configured for presentation on a display of the user computing device in response to the engagement data generated by the tracking module; and automatically displaying, by the content processing module of the server, the supplemental content data to the user on the user computing device.

In an embodiment, collecting behaviors includes automatically extracting behaviors from the user captured using at least one tracking sensor module of an eye-tracking sensor, a head-tracking sensor or an expression processing sensor, wherein the tracking sensor module is communicatively coupled to the user computing device.

In an embodiment, the tracking sensor module is an eye-tracking sensor which extracts information about an eye movement of the user and duration of the user's eye movement outside of a boundary associated with one or more portions of the displayed content data.

In an embodiment, the tracking sensor module is an head-tracking sensor which extracts information about a head movement of the user and duration of the head movement in a direction outside of a boundary associated with one or more portions of the displayed content data.

In an embodiment, the tracking sensor module is an expression processing sensor which extracts information about an expression of the user and duration of the expression within a boundary associated with one or more portions of the displayed content data.

In an embodiment, the behavior data includes information characterizing an interest of the user in one or more portions of the content data displayed on the user computing device as interested, confused, or indifferent.

In an embodiment, the supplemental content data includes information related to the content data.

In some embodiments there is a system includes a user computing device; a tracking sensor module, communicatively coupled to the user computing device, the tracking sensor module configured to collect behavior data of a user; a tracking module, configured to generate engagement data based on the collected behavior data; a communications network; and a content processing module of a server, the content processing module configured to transmit, by the content processing module of the server, content data to a display of the user computing device for display on the user computing device, dynamically generate supplemental content data configured for presentation on a display of the user computing device in response to the engagement data generated by the tracking module, and display the supplemental content data to the user on the user computing device.

In an embodiment, the system also includes an external data source that stores supplemental content data.

In an embodiment, the tracking sensor module is located in the user computing device.

In an embodiment, the tracking module and the content processing module are located in the server, and the server communicates with the user computing device via a first communication network.

In an embodiment, the system also includes an external data source, wherein the server communicates with the external data source via a second communication network.

Numerous other aspects, features and benefits of the present disclosure may be made apparent from the following detailed description taken together with the drawing figures.

BRIEF DESCRIPTION OF THE DRAWINGS

The present disclosure is herein described with reference to embodiments illustrated in the drawings. Other embodiments may be used and/or other changes may be made without departing from the spirit or scope of the present disclosure. The illustrative embodiments described in the brief description are not meant to be limiting of the subject matter presented herein.

DETAILED DESCRIPTION

Figure 1:
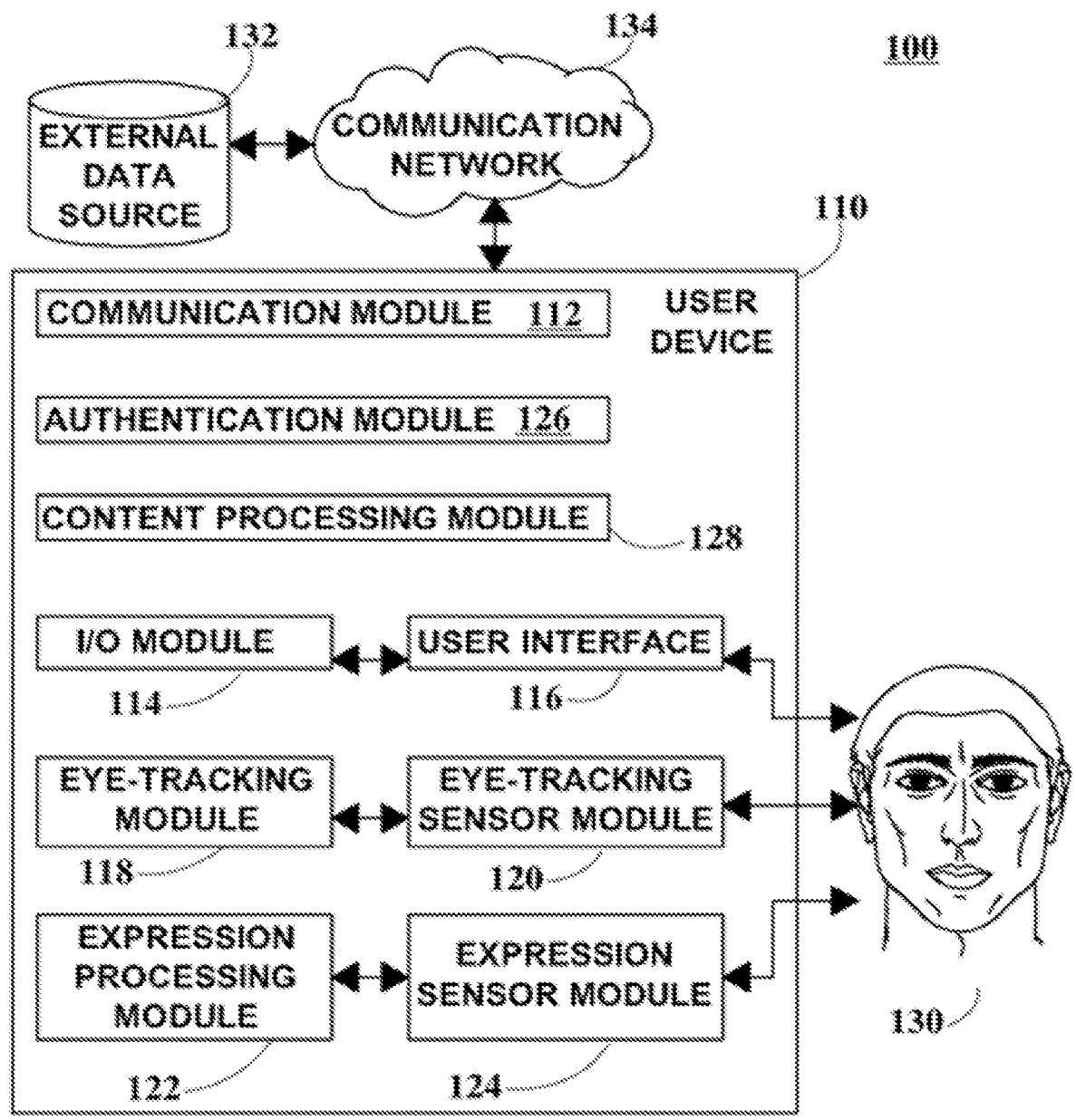
FIG. 1 is a functional block diagram illustrating a system architecture for presenting supplemental content to a user according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Systems and methods for presenting supplemental content based on head, ocular or expressive feedback are disclosed. The methods may include displaying content to a user, tracking at least one of the head position, gaze or expression of the user to generate head engagement data, ocular engagement data or emotional state data, determining if supplemental content is needed based on at least one of the head position data, ocular engagement data or emotional state data, and providing supplemental content to the user.

The disclosed methods may be implemented by a user interacting with computer systems. In some embodiments, the computer systems may include a user device, a server, and an external data source. In these embodiments, the user device includes at least one of head-tracking capabilities, eye-tracking capabilities or expression tracking capabilities. Further to these embodiments, the user device, server, and external data source may communicate using any network infrastructure. Examples of computing devices may include personal computers, tablet devices, and mobile phones, amongst others. Examples of network infrastructures may include intranets, local area networks (LAN), virtual private networks (VPN), wireless area networks (WAN) and the World Wide Web, amongst others.

FIG. 1 is a functional block diagram illustrating a system architecture for presenting supplemental content to a user based on at least one of head, ocular or expressive feedback and the displayed content.

In FIG. 1, system architecture 100 includes user device 110, external data source 132, and communications network 134. In FIG. 1, user device 110 includes communication module 112, input/output (I/O) module 114, user interface 116, tracking module 118, tracking sensor module 120, and content processing module 128. A user 130 interacts with and uses system architecture 100. The user device 110 is operably coupled to and in bi-directional communication with external data source 132 via communications network 134. In some embodiments, user interface 116 and tracking sensor module 120 are configured to operate with associated hardware (not shown, but described in FIG. 3, below) to interact with user 130. In other embodiments, system architecture 100 can include additional, fewer, or differently arranged components than those illustrated in FIG. 1.

The user device 110 can comprise one or more tracking modules and one or more tracking sensor modules. The tracking module 118 is shown in FIG. 1 as an eye-tracking module, but the tracking module 118 can be an eye-tracking module, a head-tracking module, and/or an expression-processing tracking module. The tracking sensor module 120 can be an eye-expression sensor module, a head-tracking sensor module, or an expression processing sensor module. Although FIG. 1 recites an eye-tracking module and an eye-tracking sensor module, it is intended that any tracking module or additional tracking modules can be used in the user device 110. In an example, the system architecture 100 can include any combination of two or more of an eye-expression module, a head-tracking module or an expression processing module and two or more of a tracking sensor module corresponding to the tracking modules employed in the system architecture. In yet other embodiments, components within system architecture 100 may be implemented on any type of suitable processor-controlled device that receives, processes, and/or transmits digital data, and is configured as further described in FIG. 3, below. Examples of devices incorporating one or more suitable processor-controlled devices for executing software for presenting content based on head, ocular, and expressive feedback include smartphones, desktop computers, laptop computers, servers, tablets, PDAs, and the like.

In some embodiments, user device 110 is implemented as a computing device including hardware and/or software modules configured to track and characterize the head position, gaze, and/or expression of user 130. In an embodiment, the characterization of the head position, gaze, and/or expression of user 130 generates a request for supplemental content from user 130. In this embodiment, the user device retrieves external supplemental content data from external data source 132 and processes the received external content data to produce supplemental content and displays supplemental content to user 130.

The user 130 is an end-user of user device 110 that provides input to user device 110 in order to consume content and supplemental content. In an embodiment, the input is behavioral data via a sensor module. In an embodiment, the supplemental content is associated with the displayed content. In an example, user 130 is a consumer reading reference information regarding one or more products offered by an insurance company that wishes to read additional content related to the currently displayed content. In another example, user 130 is a person in the legal industry reading reference information regarding one or more areas of law that wishes to read additional content related to the currently displayed content. In another example, user 130 is a person reading reference information regarding one or more areas related to home and gardening including cooking, and do-it-yourself projects that wishes to read additional content related to the currently displayed content. In the foregoing examples, the supplemental content is displayed based on the behavioral data. In the foregoing examples, the supplemental content is relevant to the currently displayed content.

Figure 3:
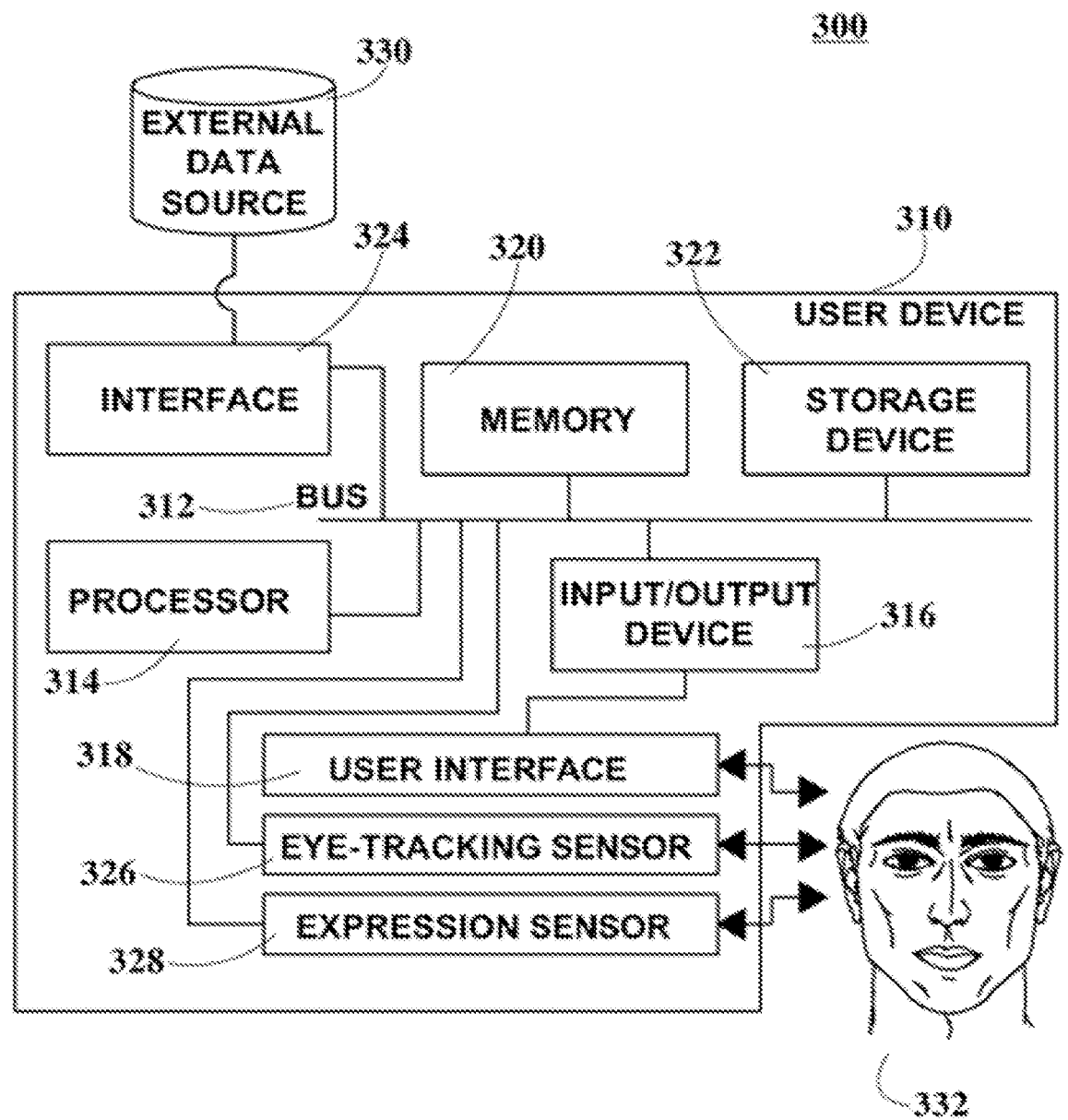
FIG. 3 is functional block diagram illustrating exemplary system hardware for presenting supplemental content to a user according to an embodiment.

In some embodiments, communication module 112 is implemented as a software module running on associated hardware, further detailed in FIG. 3, that is configured to receive command data from content processing module 128, process the received command data to produce query data, provide the query data to an external data source 132, receive result data from external data source 132, process the received result data into external content data, and provide the external content data to content processing module 128. In other embodiments, communication module 112 is further configured to process the received result data into external data and to provide the external data to content processing module 128 to be displayed to the user as supplemental content. In some embodiments, the supplemental content is relevant to the currently displayed content.

In some embodiments, communication module 112 sends and receives data via a wired or wireless connection using a desired protocol (e.g., TCP/IP, HTTP, UDP, IMAP, and the like). In some embodiments, query data includes requests for external content data contained within command data. In an example, query data includes a request for one or more supplemental content related to the displayed content. In an example, the supplemental content includes text and/or media (e.g., RSVP text, images, audio, video, and the like) or the like related to the displayed content or a portion of the displayed content. In other embodiments, query data includes requests for supplemental data specified within command data. In these embodiments, query data includes a request for a definition of one or more terms in content presented to user 130, a request for media associated with the one or more terms, and the like. Optionally, the supplemental content can be additional information on terminology within the displayed content or the supplemental content can be a response to content navigation request. For example, if the displayed content is a life insurance policy the supplemental content may be terminology for various types of life insurance policies. In another example if the displayed content pertains to legal information, the supplemental content may be cases, laws or regulations referenced in the displayed content. In another example if the displayed content pertains to a cooking recipe, the supplemental content may be nutritional information, measurement conversions or ingredient substitution information. Optionally, the supplemental content may contain a hyperlink to additional content related to the supplemental content. If the system detects that the user has a state of discontent, confusion, unhappiness, etc. that the user has shifted its gaze or changed the position of its head, the system can display supplemental content related to the displayed content so that present content may be easier to understand or more interesting.

In other embodiments, input/output module 114 is implemented as a software module running on associated hardware, further detailed in FIG. 3, and configured to receive input data from the tracking module 118 and/or the tracking sensor module 120 to process the received input data into instruction data, and to provide the instruction data to content processing module 128. In these embodiments, input/output module 114 is further configured to receive output data from content processing module 128, process the received output data to generate content, and display the generated content to the user as supplemental content on the display of the user device 110. In some embodiments, the supplemental content is relevant to the currently displayed content.

In some embodiments, instruction requests are one or more of requests for content associated with currently displayed content. In an example, instruction data includes requests for additional content related to at least a portion of content on an electronic document (e.g., a section of an insurance policy, contract, and the like) being displayed to the user. Optionally, the instruction requests are generated based on the tracking at least one of the head position, gaze, or expression of the user. For example, if the head position or gaze of the user indicates the user is focused on a portion of the user interface 116 that contains the displayed content, supplemental content related to the displayed content will be generated and displayed to the user.

In some embodiments, user interface 116 is implemented as a software module running on associated hardware, further detailed in FIG. 3, and configured to receive input from user 130, processes the received input into input data, provide the input data to input/output module 114, receives content from input/output module 114, and displays content to user 130. In these embodiments, input data includes user requests to display a desired set of supplemental content relevant to the content currently being viewed.

In the example shown in FIG. 1, tracking module 118 is an eye tracking module that is implemented as a software module running on associated hardware, further detailed in FIG. 3, and configured to receive command data from content processing module 128, process the command data into hardware operation data, and provide the hardware operation data to eye-tracking sensor module 120. In these embodiments, eye-tracking module 118 is further configured to receive ocular sensor data from eye-tracking sensor module 120, processes the ocular sensor data to generate ocular engagement data, and provides the ocular engagement data to content processing module 128. Further to these embodiments, ocular engagement data includes one or more metrics characterizing the level of engagement of user 130 with content being displayed via user interface 116. In an example, the ocular engagement data includes data describing whether or not the gaze of user 130 is directed toward the content displayed via user interface 116, a general level of interest in the content displayed via user interface 116 as determined by the eye movements of user 130, and the like. In these embodiments, hardware operation data includes instructions for hardware operation, such as instructions to activate eye-tracking sensors, to begin to track the gaze of user 130, to stop tracking the gaze of user 130, and the like.

In some embodiments, tracking sensor module 120 is an eye sensor tracking module which is implemented as software configured to control associated hardware, further detailed in FIG. 3, and configured to receive hardware operation data from eye-tracking module 118, interact with user 130 in order to generate ocular sensor data, and provide the ocular sensor data to eye-tracking module 118. In these embodiments, ocular sensor data includes data describing the movement of the eyes of user 130. In an example, eye-tracking sensor module 120 is implemented as software configured to control camera hardware (e.g., a camera pair, not shown) included within user device 110 that is configured to determine the direction of the gaze of user 130. In this example, ocular sensor data includes the length of stare of user 130 on one or more regions of content being displayed via user interface 116, whether or not user 130 is looking at one or more portions of content being displayed via user interface 116, and the path of the gaze of user 130 as user 130 views content being displayed via user interface 116.

Eye tracking module 118 may utilize sensor or camera data to determine the gaze of a user. In one embodiment, a light (e.g., infrared) is reflected from the user's eye and a video camera or other sensor can receive the corneal reflection. The eye tracking module 118 analyzes the ocular sensor data to determine eye rotation from a change in the light reflection. A vector between a pupil center and the corneal reflections can be used to compute a gaze direction. Eye movement data may be based upon a saccade and/or a fixation, which may alternate. A fixation is generally maintaining a visual gaze on a single location, and it can be a point between any two saccades. A saccade is generally a simultaneous movement of both eyes between two phases of fixation in the same direction.

In one implementation, the eye tracking module can use a dark-pupil technique, whereby if the illumination source is offset from the optical path, then the pupil appears dark as the retroreflection from the retina is directed away from the camera. In another implementation, the eye tracking module can use a bright-pupil technique, whereby if the illumination is coaxial with the optical path, then the eye acts as a retro reflector as the light reflects off the retina creating a bright pupil effect.

In another embodiment, a camera or sensor can track eye image features (e.g., retinal blood vessels) and follow the features as the eye rotates. It is preferable that the eye tracking data is obtained in a manner that is non-invasive.

In yet another embodiment, a camera or sensor can identify a location of an iris or pupil based on the circular shape or by detection an edge. The movement of the iris or pupil can then be detected.

An expression processing module can be an eye-tracking processing module or a head tracking module. In some embodiments, the expression processing module 122 can use a coding system that recognizes eye movement and/or gaze direction and generates a score based on duration and direction. Eye movement or gazing may have a duration of about ⅕ of a second to 2 seconds or longer, so the expression processing module 122 will receive a data feed of eye movements from a high speed camera having increments of less than one second to account for very quick changes. Some micro-eye movements occur so quickly that a human observer cannot detect or sense the shift in gaze or eye movement. In one embodiment, supplemental content will be displayed when the eye movement meets a threshold value, when the gaze is directed away from the displayed content, or both.

In some embodiments, the tracking sensor module 120 is a head tracking sensor module which is implemented as software configured to control associated hardware, further detailed in FIG. 3, and configured to receive hardware operation data from head-tracking module 118, interact with user 130 in order to generate head position data, and provide the head position data to head tracking module 118. In these embodiments, head position data includes data describing the movement of the head of user 130. In an example, head-tracking sensor module 120 is implemented as software configured to control camera hardware (e.g., a camera pair, not shown) included within user device 110 that is configured to determine the position of the head of user 130. In this example, head position data includes the position of the head of user 130 with respect to one or more regions of content being displayed via user interface 116, whether or not user 130 is looking at one or more portions of content being displayed via user interface 116, and the path of the head movement user 130 as user 130 views content being displayed via user interface 116.

Head tracking module 118 may utilize sensor or camera data to determine the initial head position of a user and any subsequent change from the initial head position. In one embodiment, a light (e.g., infrared) is reflected from the user's head and a video camera or other sensor can receive the reflection from the user's head. The head tracking module 118 analyzes the head position data to determine head movement from a change in the light reflection. A vector between a location on the user's head and the head reflections can be used to compute a change in head position or direction. Head position data may be based upon a movement and/or a fixation, which may alternate. A fixation is generally maintaining a head position in single location. A movement is generally any change in position of the head from an initial position.

In one implementation, the head tracking module can use a marker technique, whereby if the illumination source is offset from the marker on the user movement is determined.

In another embodiment, a camera or sensor can track head image features (e.g., how much of the head is shown, if only a portion of the head e.g. a cheek or the top of the head) and follow the features as the head rotates or moves. It is preferable that the head tracking data is obtained in a manner that is non-invasive.

In some embodiments, an expression processing module 122 is implemented as a software module running on associated hardware, further detailed in FIG. 3, and is configured to receive command data from content processing module 128, configured to process the command data into hardware operation data, and configured to provide the hardware operation data to expression sensor module 124. In these embodiments, expression processing module 122 is further configured to receive expression sensor data from expression sensor module 124, process the expression sensor data to generate emotional state data, and provide the emotional state data to content processing module 128. The expression sensor data represents a micro-expression of the user, which can be a brief, involuntary facial expression that is shown on the user's face while the user is experiencing the emotion.

Further to these embodiments, emotional state data can be processed to generate data describing the emotional state of user 130. In an example, emotional state data describes whether or not user 130 is confused by content being displayed via user interface 116. In this example, the emotional state data can be generated by implementing methods similar to those described in Chiu, Mei-Hung, et al, "The role of facial microexpression state (FMES) change in the process of conceptual conflict." *British Journal of Educational Technology* 45.3 (2014): 471-486. In these embodiments, hardware operation data includes instructions for hardware operation, such as instructions to activate expression sensors, to begin to track the expression of user 130, to stop tracking the expression of user 130, and the like.

In some embodiments, expression sensor module 124 is implemented as software configured to control associated hardware, further detailed in FIG. 3, and configured to receive hardware operation data from expression processing module 122, interact with user 130 in order to generate expression sensor data, and provide the expression sensor data to expression processing module 122. In these embodiments, expression sensor data includes data describing micro-expressions of user 130 (e.g., expression skeletons describing facial states, and the like). In an example, expression sensor module 124 is implemented as software configured to control a camera, not shown, included within user device 110 that is configured to detect the micro-expressions of user 130. In this example, expression sensor data includes images of user 130 as user 130 views content displayed via user interface 116.

The expression processing module 122 can use a facial action coding system that recognizes changes in a facial expression and generates a score based on duration, intensity, and asymmetry. Facial expressions may have a duration of about $\frac{1}{25}$ to $\frac{1}{15}$ of a second, so the expression processing module 122 will receive a data feed of facial movements from a high speed camera having increments of less than one second to account for very quick changes. Some micro-expressions occur so quickly that a human observer cannot detect or sense the expression. In one embodiment, the expression processing module may require a threshold amount of time that a user holds a particular expression (e.g., $\frac{1}{25}$ second, $\frac{1}{4}$ second, $\frac{1}{3}$ second, $\frac{1}{2}$ second) before adjusting content in view of that expression. In order to capture only micro-expressions, the expression processing module may also include a threshold of a maximum amount of time for that particular expression (e.g., $\frac{1}{2}$ second, $\frac{2}{3}$ second, $\frac{3}{4}$ second, 1 second, 1.5 seconds). In an alternative embodiment, the expression processing module is not limited to only micro-expressions.

In one embodiment, the tracking processing module may require a threshold amount of time that a micro-expressions or expression is maintained (e.g., $\frac{1}{25}$ second, $\frac{1}{4}$ second, $\frac{1}{3}$ second, $\frac{1}{2}$ second) before displaying supplemental content.

In one example, the expression processing module may receive data from a camera or other sensor and process the data to determine that the user is in a state of disgust based on the expression sensor data. Data that may be relevant to determining the state of disgust can include data that represents that the user has raised an upper lid, raised a lower lip, wrinkled the nose, raised cheeks, and/or lines below the lower lid. In another example, a state of anger may be associated with a profile having data that represents lowered eyebrows, a wrinkled forehead, tensed eyelids, and tensed lips. A file containing a set of profiles, which may be stored in a database (not shown) associated with the server 240, may be used to match the expression sensor data by converting the data to generate action unit scores of the facial action coding system and then determining a similarity to any stored profiles.

Upon receiving this data, the expression processing module compares this data to stored profiles and can determine that this data matches a profile of disgust or confusion. Based on this determined profile, the system may generate additional content based on the content that was being viewed in association with this state or respond to an instruction request. In an embodiment, the additional content may be stored in a database and tagged with a particular state, such that if the user is disgusted with a price or confused about a term, additional content can be displayed that justifies the price or offers alternative pricing schemes or provides supplemental content about a term. Optionally, the supplemental content can be additional information on terminology within the displayed content. For example, if the displayed content is a life insurance policy the supplemental content may be terminology for various types of life insurance policies. In another example if the displayed content pertains to legal information, the supplemental content may be cases, laws or regulations referenced in the displayed content. In another example if the displayed content pertains to a cooking recipe, the supplemental content may be nutritional information, measurement conversions or ingredient substitution information.

In some embodiments, content processing module 128 is implemented as a software module running on associated hardware, further detailed in FIG. 3, and configured to receive user instruction data from input/output module 114, receive one or more of ocular engagement data from eye-tracking module, receive head position data from the head position tracking module and/or receive emotional state data from expression processing module or head position data from a tracking module 118, process one or more of the head position data, ocular engagement data, and/or emotional state data to generate command data, and to provide the command data to the communication module 112. In these embodiments, content processing module 128 is further configured to receive external content data from communication module 112, to retrieve internal content data from a storage device associated with user device 110 (further detailed in FIG. 3), and process said external content data and internal content data to generate output. Further to these embodiments, content processing module 128 is configured to receive supplemental external data from communication module 112, to retrieve supplemental internal data from the storage device associated with user device 110, and process the supplemental external data and the supplemental internal data to generate output data. In an embodiment, the output data is a response to command data. In an embodiment, the output data is generated based on collected behavior data.

In some embodiments, command data includes instructions for a communications module to retrieve data specified within user instruction data. In some embodiment, command data includes instructions for a communications module to retrieve data based on collected behavior data. In some embodiments, command data includes instructions for a communications module to retrieve data when a threshold value is met. In an example, command data includes instructions associated with communication module 112 for it to generate a desired query data. In these embodiments, command data includes instructions for module 118 and processing module 122 to present supplemental content, navigate the content (e.g. pausing the displayed text, resuming the displayed text, scrolling through the text, skipping forward or rewinding in the content and the like) and present the content.

Further to these embodiments, supplemental internal content data includes text, images, and other media stored within a storage device associated with user device 110. In these embodiments, supplemental internal data includes text, images, and other media that is supplemental to content currently and/or previously presented to user 130. Still further to these embodiments, output data includes text, images, video, and layout information. In an example, output data includes RSVP text to be presented to user 130. In an example, output data includes content generated in response to an instruction request such as supplemental content, navigation to a specified location of the content (e.g., a section of an insurance policy, contract, and the like), or control settings associated with the display of the content, initiate, change, pause or stop a command associated with the content (e.g. pausing the displayed content, resuming the displayed content, scrolling through the content, and the like).

In some embodiments, external data source 132 is implemented as a data source configured to receive query data from communication module 112, process the query data to generate result data, and provide the result data to communication module 112. In these embodiments, external data source 132 is implemented as a database that includes content information, such as for example images, text (e.g., books, articles, encyclopedia entries, blog posts, and the like), videos, metadata (e.g., relationships between images, texts, videos, and the like), and the like. In an example, external data source 132 is a database including company guidelines, sample insurance policies, explanations of insurance policies, a glossary of terms associated with insurance policies, metadata about the relationship between the terms within the glossary of terms and one or more sample insurance policies, and the like. In other embodiments, external data source 132 is implemented as a third party information source, such as an online encyclopedia, image server, video server, dictionary, and the like. In these embodiments, external data source 132 may be implemented as a database management system (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database (MDB), and the like.

In operation, user 130 operates user device 110 via user interface 116. In some embodiments, the user 130 operates user device 110 and provides an input including a request that content be displayed on user device 110 via user interface 116. In these embodiments, user interface 116 receives the input, generates input data, and provides the input data to input/output module 114.

In some embodiments, the user 130 operates user device 110 and provides an input including a request that content be displayed on user device 110 via the tracking sensor module 120. In these embodiments, the tracking module 118 receives behavioral data from the tracking sensor module 120. In an example, the behavioral data is ocular engagement data from the eye-tracking module, head position data from the head position tracking module or emotional state data from expression processing module. The tracking module 118 processes the data to generate command data, and to provide the command data to the communication module 112. In an example the tracking module processes one or more of head position data, ocular engagement data, and/or emotional state data. Still further to these embodiments, input/output module 114 generates user instruction data and provides the user instruction data to content processing module 128.

In these embodiments, content processing module 128 processes the user instruction data and determines supplemental content to display. In an embodiment, the content processing module 128 determines supplemental content associated with the content. Further to this embodiment, the content processing module 128 determines supplemental content that is relevant to the content. Yet further to this embodiment, the content processing module 128 determines if one or more portions of the supplemental content are stored as internal content data within a storage device associated with user device 110, and further determines that one or more other portions not stored within the storage device may be stored as external content data within external data source 132. Still further to these embodiments, content processing module 128 generates a command data including a request for external content data, and provides the command data to communication module 112. In these embodiments, communication module 112 receives the command data, generates a query data, and provides the query data to external data source 132. Yet further to these embodiments, external data source 132 receives the query data, processes it to generate a result data, and provides the result data to communication module 112. In these embodiments, communication module 112 receives the result data, processes the result data to generate external content data, and provides the external content data to content processing module 128. Yet still further to these embodiment, content processing module 128 receives the external content data, retrieves the internal content data from the storage device associated with user device 110, and processes the external content data and internal content data to generate output data. In these embodiments, content processing module 128 provides the output data to input/output module 114, input/output module 114 processes the output data into content, input/output module 114 provides the content to user interface 116, and user interface 116 displays the received supplemental content to user 130. In an embodiment, the supplemental content is relevant to the displayed content.

In some embodiments, content processing module 128 processes the user instruction data via the tracking module 118. In these embodiments, the tracking sensor module 120 automatically begins to track the movements of the user 130 while user 130 consumes the content data in order to generate sensor data. In these embodiments, the tracking sensor module 120 then provides the sensor data to tracking module 118. In an example the tracking sensor module 120 is a head tracking sensor module, an eye-tracking sensor module and/or an expression-tracking sensor module. Yet still further to these embodiments, the tracking module 118 receives the sensor data, processes it to generate behavior engagement data, and provides the behavior engagement data to content processing module 128. In these embodiments, the processing module 122 is a head-tracking module, an eye-tracking module and/or an expression-tracking module. Further to these embodiments, content processing module 128 receives the behavior engagement data and processes it to dynamically determine whether user 130 requires supplemental content. In these embodiments, after determining that user 130 requires supplemental content, content processing module 128 then determines that one or more portions of the supplemental content are stored as supplemental internal data within a storage device associated with user device 110, and one or more other portions not stored within said storage device may be stored as supplemental external data within external data source 132. Still further to these embodiments, content processing module 128 proceeds to generate a command for data including a request for supplemental external data, and provides the command for data to communication module 112. In these embodiments, communication module 112 receives the command for data, generates a query data, and provides the query data to external data source 132. Yet further to these embodiments, External Data Source 132 receives the query data, processes it to generate result data, and provides the result data to communication module 112. In these embodiments, communication module 112 receives the result data, processes the result data to generate supplemental external data, and provides the supplemental external data to content processing module 128. Still yet further to these embodiments, content processing module 128 then receives the supplemental external data, retrieves the supplemental internal data from the storage device associated with user device 110, and processes the external content data and supplemental internal data to generate an output data. In these embodiments, content processing module 128 then provides the output data to input/output module 114, input/output module 114 processes the input/output data into content, input/output module 114 provides the content to user interface 116, and user interface 116 displays the received content to user 130 as supplemental content. Optionally, the supplemental content can be additional information on terminology within the displayed content. For example, if the displayed content is a life insurance policy the supplemental content may be terminology for various types of life insurance policies. In another example if the displayed content pertains to legal information, the supplemental content may be cases, laws or regulations referenced in the displayed content. In another example if the displayed content pertains to a cooking recipe, the supplemental content may be nutritional information, measurement conversions or ingredient substitution information.

Figure 2:
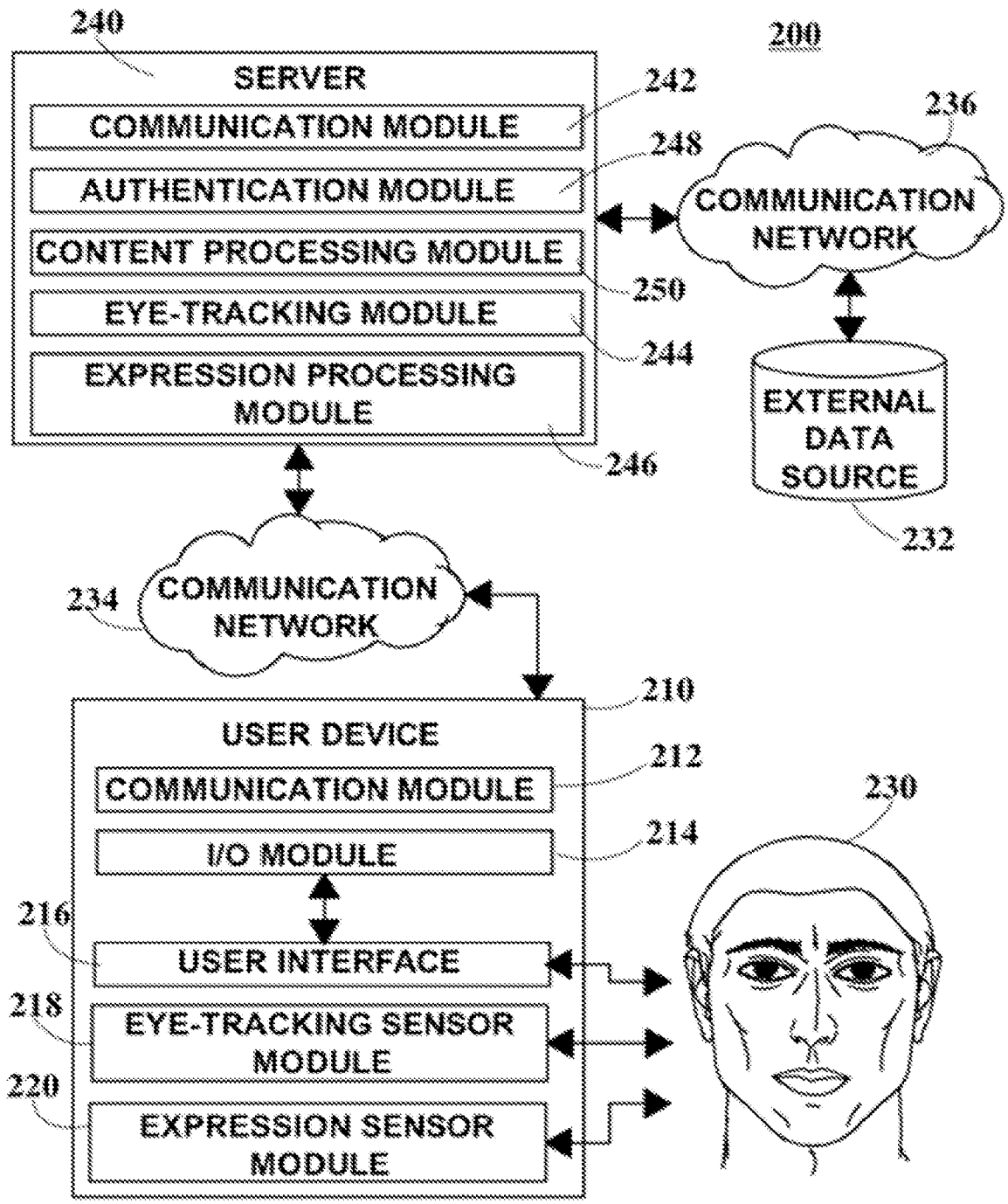
FIG. 2 is a functional block diagram illustrating a system architecture for presenting supplemental content to a user according to another embodiment.

FIG. 2 is a functional block diagram illustrating a system architecture for presenting supplemental content to a user and/or navigating content, according to another embodiment. In FIG. 2, system architecture 200 includes user device 210, user 230, external data source 232, first communications network 234, second communications network 236, and server 240. In some embodiments, user device 210 includes user device communication module 212, input/output module 214, user interface 216 and tracking sensor module 218. In FIG. 2, server 240 includes server communication module 242, tracking module 244, and Content Processing Module 250.

In some embodiments, user device 210 is operably coupled to and in bi-directional communication with server 240 via first communications network 234, and server 240 is operably coupled to and in bi-directional communication with external data source 232 via second communications network 236. In these embodiments, user interface 216 and tracking sensor module 218 are configured to operate with associated hardware (not shown, but described in FIG. 4, below) to interact with user 230 and collect behavioral data on the user 230.

In other embodiments, system architecture 200 can include additional, fewer, or differently arranged components than those illustrated in FIG. 2. In yet other embodiments, components within system architecture 200 may be implemented on any type of suitable processor-controlled device that receives, processes, and/or transmits digital data, and is configured as further described in FIG. 4, below. Examples of devices incorporating one or more suitable processor-controlled devices for running software for presenting content based on ocular and expressive feedback include smartphones, desktop computers, laptop computers, servers, tablets, PDAs, and the like.

In some embodiments, user device 210 is implemented as a computing device including hardware and/or software modules configured to receive input (e.g., a request for content, user credentials, and the like) from user 230, receive hardware operation data from server 240, provide data (e.g., user instruction data, ocular sensor data, head movement data, expression sensor data, and the like) to server 240, and receive output data from server 240, and to display content to user 230. In these embodiments, server 240 is implemented as a computing device including hardware and or software modules able to receive user instruction data, retrieve external content data from external data source 232, process the received external content data to produce content, and characterize the head movement, gaze and/or expression of user 230. Further to these embodiments, user 230 is an end-user of user device 210 that provides input to user device 210 in order to consume content and consume supplemental content relevant to content being displayed to the user. In an example, user 230 is viewing a life insurance policy and when the characterization of the head movement, gaze and/or expression of the user generates a display of supplemental content, the supplemental content is related to the life insurance policy, e.g. be terminology for various types of life insurance policies. In another example user 230 is viewing content that pertains to legal information and when the characterization of the head movement, gaze and/or expression of the user generates a display of supplemental content, the supplemental content is related to the legal information, e.g. be cases, laws or regulations referenced in the displayed content. In another example if the user 230 is viewing content that pertains to a cooking recipe, when the characterization of the head movement, gaze and/or expression of the user generates a display the supplemental content, the supplemental content is related to the recipe, e.g. be nutritional information, measurement conversions or ingredient substitution information.

Figure 4:
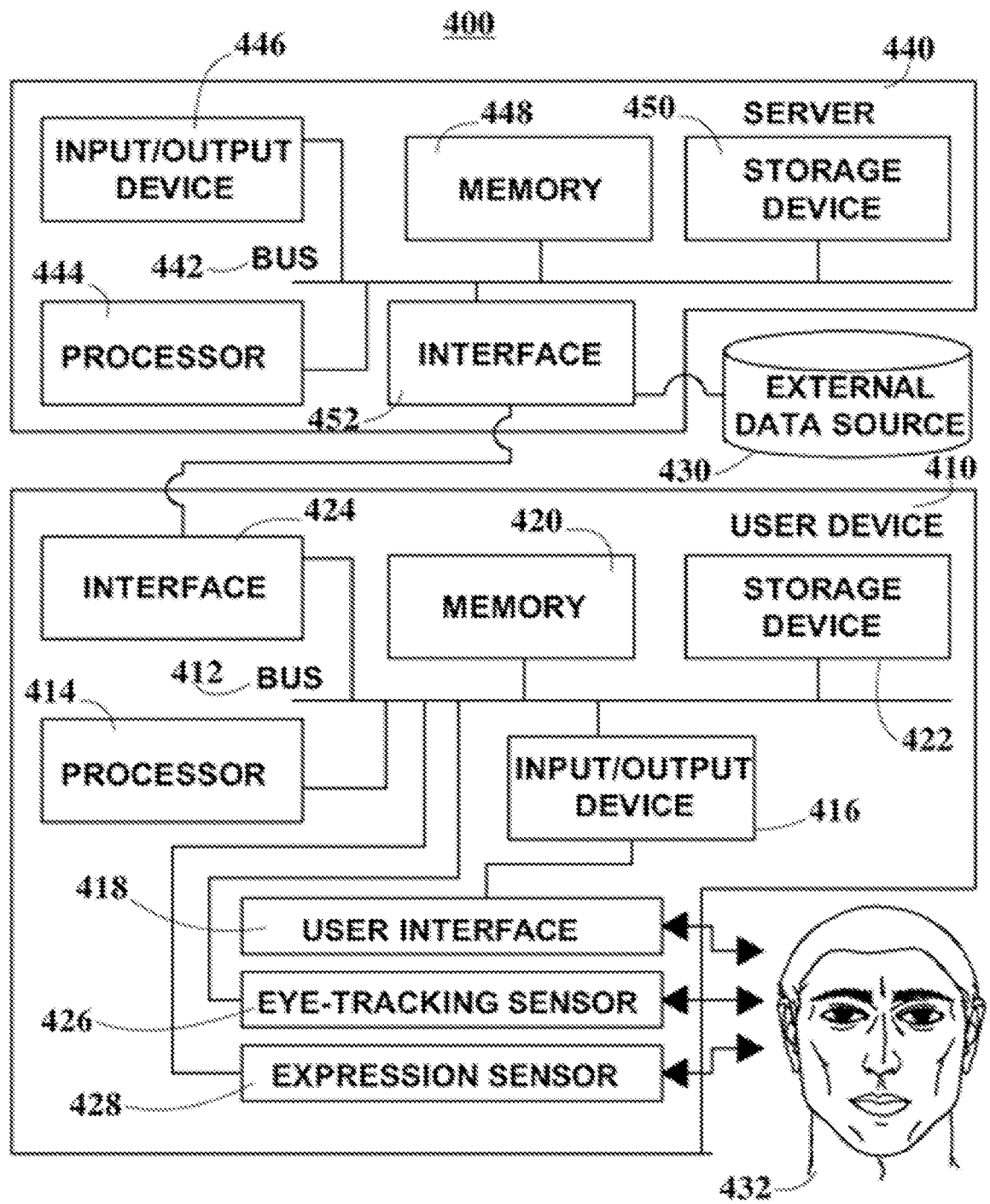
FIG. 4 is functional block diagram illustrating exemplary system hardware for presenting supplemental content to a user according to another embodiment.

In some embodiments, user device communication module 212 is implemented as a software module running on associated hardware, further detailed in FIG. 4, configured to receive user instruction data from input/output module 214, receive sensor data from tracking sensor module 218, and to receive one or more of output data and/or hardware operation data from server communication module 242. In these embodiments, user device communication module 212 is further configured to provide output data to input/output module 214, provide hardware operation data to tracking sensor module 218 and provide one or more of user instruction data, and/or sensor data to server communication module 242. Further to these embodiments, communication module 212 sends and receives data via a wired or wireless connection using a desired protocol (e.g., TCP/IP, HTTP, UDP, IMAP, and the like).

In some embodiments, input/output module 214 is implemented as a software module running on associated hardware, further detailed in FIG. 4, and configured to receive input data from user interface 216, to process the received input data into instruction data, and to provide the instruction data to user device communication module 212. In these embodiments, input/output module 214 is further configured to receive output data from user device communication module 212, process the received output data to generate content, and provide the generated content to user interface 216. Further to these embodiments, input/output module 214 is configured to receive input data from user interface 216, to process the received input data into supplemental data, and to provide the supplemental data to user device communication module 212. In an embodiment, the supplemental data is associated with the displayed content.

In some embodiments, user interface 216 is implemented as a software module running on associated hardware, further detailed in FIG. 4, configured to receive input from user 230, process the received input into input data, provide the input data to input/output module 214, receive content from input/output module 214, and display content to user 230. In these embodiments, input data includes user requests to display a desired set of content, user instructions to display supplemental content associated with the display of content, and the like.

In some embodiments, tracking sensor module 218 is implemented as software configured to control associated hardware, further detailed in FIG. 4, and configured to receive hardware operation data from user device communication module 212, interact with user 230 in order to generate sensor data, and provide the sensor data to user device communication module 212. In some embodiments, the tracking sensor module is at least one of an eye-tracking sensor module, a head tracking sensor module, or an expression sensor module. In these embodiments, sensor data includes data describing the users behavior, e.g. movement of the eyes of user 230, movement of the head of the user, or expressions and micro expressions of the user.

In an example, tracking sensor module 218 is an eye-tracking sensor module that is implemented as software configured to control camera hardware (e.g., a camera pair, not shown) within user device 210 that is configured to determine the direction of the gaze of user 230. In this example, ocular sensor data includes the length of stare of user 230 on one or more regions of content being displayed via user interface 216, whether or not user 230 is looking at one or more portions of content being displayed via user interface 216, and the path of the gaze of user 230 as user 230 views content being displayed via user interface 216.

In an example, tracking sensor module 218 is a head tracking sensor module that is implemented as software configured to control camera hardware (e.g., a camera pair, not shown) within user device 210 that is configured to determine the head position and any head movements of user 230. In this example, head movement sensor data includes the position of the head of the user 230 as it relates to one or more regions of content being displayed via user interface 216, whether or not user 230 is looking at one or more portions of content being displayed via user interface 216, and if a portion of the head e.g. the top of the head, a cheek or profile of user 230 as it relates to one or more regions of content being displayed via the user interface 216.

In some embodiments, the tracking sensor module 218 is an expression sensor module implemented as software configured to control associated hardware, further detailed in FIG. 4, and configured to receive hardware operation data from user device communication module 212, interact with user 230 in order to generate expression sensor data, and provide the expression sensor data to user device communication module 212. In these embodiments, expression sensor data includes data describing micro-expressions of user 230. In an example, expression sensor module 218 is implemented as software configured to control a camera, not shown, within user device 210 that is configured to detect the micro-expressions of user 230. In this example, expression sensor data includes images of user 230 as user 230 views content displayed via user interface 216.

In some embodiments, server communication module 242 is implemented as a software module running on associated hardware, further detailed in FIG. 4, that is configured to receive command data from content processing module 250, processes the received command data to produce query data, provide the query data to an external data source 232, receive result data from external data source 232, processes the received result data into external content data, and provides the external content data to content processing module 250. In these embodiments, server communication module 242 is further configured to process the received result data into external supplemental data and to provide the external supplemental data to content processing module 250. Further to these embodiments, server communication module 242 is further configured to receive output data and/or hardware operation data from content processing module 250. In these embodiments, server communication module 242 is further configured to receive one or more of user instruction data, head movement data, ocular sensor data, and/or expression sensor data from user device communication module 212. Still further to these embodiments, server communication module 242 is yet further configured to provide received user instruction data to content processing module 250, provide received sensor data to the tracking module 244. In these embodiments, server communication module 242 sends and receives data via a wired or wireless connection using a desired protocol (e.g., TCP/IP, HTTP, UDP, IMAP, and the like).

In some embodiments, tracking module 244 is implemented as a software module running on associated hardware, further detailed in FIG. 4, and configured to receive command data from content processing module 250, process the command data into hardware operation data, and provide the hardware operation data to server communication module 242. In these embodiments, tracking module 244 is further configured to receive sensor data from server communication module 242, processes the sensor data to generate behavioral engagement data, and provide the behavioral engagement data to content processing module 250. In an embodiment, the behavioral engagement data can be at least one of head-movement data, ocular data, or expression data. Further to these embodiments, behavioral engagement data includes one or more metrics characterizing the level of engagement of user 230 with content being displayed via user interface 216. In an example, the behavioral engagement data includes data describing whether or not the gaze or head of user 230 is directed towards the content displayed via user interface 216, a general level of interest in the content displayed via user interface 216 as determined by the eye movements or head position of user 230, emotional state data that describes whether or not user 230 is confused by content being displayed via user interface, and the like. In these embodiments, hardware operation data includes instructions for hardware operation, such as instructions to provide supplemental content to the user 230.

In some embodiments, content processing module 250 is implemented as a software module running on associated hardware, further detailed in FIG. 4, configured to receive user instruction data from server communication module 242, receive behavioral engagement data from tracking module 244, process one or more of the received user instruction data, behavioral engagement data to generate command data, and to provide the command data to one or more of server communication module 242. In these embodiments, content processing module 250 is further configured to receive external content data from server communication module 242, to retrieve internal content data from a storage device associated with server 240 (further detailed in FIG. 4), and process said external content data and internal content data to generate output data. Further to these embodiments, the output data is supplemental data that is relevant to the content being viewed by the user.

In some embodiments, command data includes instructions for a communications module to retrieve data specified within user instruction data. In an example, command data includes instructions associated with server communication module 242 for it to generate a desired query data. In this example, the instructions include requests for specific supplemental content information relevant to the content or a portion of the content on display. In this embodiment, internal content data includes text, images, and other media of a supplemental nature to content presented to user 230 stored within a storage device and/or memory associated with server 240. In this embodiment, output data includes text, images, and other media of a supplemental nature to content presented to user 230.

In some embodiments, external data source 232 is implemented as a data source configured to receive query data from server communication module 242, process the query data to generate result data, and provide the result data to server communication module 242. In these embodiments, external data source 232 is implemented as a database that includes content information, such as for example images, text (e.g., books, articles, encyclopedia entries, blog posts, and the like), videos, metadata (e.g., relationships between images, texts, videos, and the like), and the like. In an example, external data source 232 is a database including company guidelines (e.g., the company guidelines of the company user 230 works for), sample insurance policies, explanations of insurance policies, a glossary of terms associated with insurance policies, metadata about the relationship between the terms within the glossary of terms and one or more sample insurance policies, and the like. In other embodiments, external data source 232 is implemented as a third party information source, such as an online encyclopedia, image server, video server, dictionary, legal reference information and the like. In these embodiments, external data source 232 may be implemented as a database management system (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database (MDB), and the like.

In operation, user 230 operates user device 210 via user interface 216. In some embodiments, user interface 216 displays content to user 230. In some embodiments, tracking sensor module 218 tracks at least one of the head position, gaze or expressions of user 230 as user interface 216 presents the content to user 230. In these embodiments, tracking sensor module 218 provides behavioral sensor data to user device communication module 212, user device communication module 212 provides the behavioral sensor data to server communication module 242, and server communication module 242 provides the behavioral sensor data to tracking module 244. In these embodiments, tracking module 244 receives the behavioral sensor data, processes it to generate behavioral engagement data, and provides the behavioral engagement data to content processing module 250. In these embodiments, content processing module 250 receives the behavioral engagement data and processes it to determine that user 230 requires supplemental content. Yet still further to these embodiments, content processing module 250 determines that one or more portions of the supplemental content are stored as supplemental internal data within a storage device associated with server 240, and one or more other portions not stored within said storage device may be stored as supplemental external data within external data source 232. In these embodiments, content processing module 250 proceeds to generate a command data including a request for supplemental external data, and provides the command data to server communication module 242. Further to these embodiments, server communication module 242 receives the command data, generates a query data, and provides the query data to external data source 232. In these embodiments, external data source 232 receives the query data, processes it to generate a result data, and provides the result data to server communication module 242. Yet further to these embodiments, server communication module 242 receives the result data, processes the result data to generate external data, and provides the external data to content processing module 250. In these embodiments, content processing module 250 then receives the external data, retrieves the internal data from the storage device associated with server 240, and processes the external content data and internal data to generate an output data. Still further to these embodiments, content processing module 250 provides the output data to server communication module 242, server communication module 242 provides the output data to user device communication module 212, and user device communication module 212 provides the output data to input/output module 214. In these embodiments, input/output module 214 then processes the output data into content, input/output module 214 provides the content to user interface 216, and user interface 216 displays the received content to user 230 as content. In an embodiment the content is supplemental content that is relevant to the content displayed to the user.

FIG. 3 is a functional block diagram illustrating exemplary system hardware for presenting supplemental content to a user based on behavioral feedback, according to an embodiment.

In FIG. 3, system hardware 300 includes user device 310, external data source 330, and user 332. In FIG. 3, user device 310 further includes bus 312, processor 314, input/output device 316, user interface 318, memory 320, storage device 322, interface 324, and tracking sensor 326. In some embodiments, system hardware 300 can include additional, fewer, or differently arranged components than those illustrated in FIG. 3.

In FIG. 3, user device 310 is electronically coupled to and in bi-directional communication with external data source 330. In some embodiments, bus 312 is electronically coupled to and in bi-directional communication with processor 314, input/output device 316, memory 320, storage device 322, interface 324, and tracking sensor 326. In these embodiments, user interface 318 is rendered by input/output device 316. Further to these embodiments, user interface 318 and tracking sensor 326 are configured to interact with user 332. In these embodiments, bus 312 includes a path that allows components within user device 310 to communicate with each other. In an embodiment, the tracking sensor 326 can be at least one of a head-tracking sensor, an eye-tracking sensor or an expression-tracking sensor.

In some embodiments, processor 314 is implemented as any computing hardware component including a central processing unit configured to execute instructions to perform one or more actions associated with user device 310. In these embodiments, processor 314 can include a microprocessor, an application specific integrated circuit (ASIC), a field programmable object array (FPOA), and the like. Further to these embodiments, processor 314 interprets and executes instructions retrieved from memory 320 and storage device 322. In an example and referring to FIG. 1, processor 314 is configured to interpret and execute instructions associated with the operation of communication module 112, input/ output module 114, user interface 116, tracking module 118, tracking sensor module 120 and content processing module 128.

In some embodiments, input/output device 316 is implemented as a computer hardware component that includes peripherals and/or other mechanisms that may enable a user to input information to user device 310, including keyboards, computer mice, buttons, touch screens, voice recognition, biometric mechanisms, and the like. In these embodiments, input/output device 316 may be further configured to include one or more mechanisms for outputting information to user 332, such as, for example displays, light emitting diodes (LEDs), printers, speakers, and the like. Further to these embodiments, input/output device 316 is implemented to include a computer hardware component configured to output data to user 332 via textual and/or graphical content, such as RSVP text, images, videos, audio, and the like. In these embodiments, input/output device 316 is further configured to provide content by rendering the content onto user interface 318 and to receive input from user 332 via user interface 318. In an example and referring to FIG. 1, user interface 318 is implemented in a manner substantially similar to user interface 116.

In some embodiments, memory 320 is implemented as a computing hardware component that allows the storage and manipulation of data during operations carried out by processor 314. In an example and referring to FIG. 1, memory 320 allows the storage and manipulation of data during operations associated with communication module 112, input/output module 114, user interface 116, tracking module 118, tracking sensor module 120 and/or content processing module 128. Examples of memory 320 include random access memory (RAM), read-only memory (ROM), flash memory, and the like.

In some embodiments, storage device 322 is implemented as a computer hardware component that allows the storage and retrieval of data associated with running one or more modules and is configured to store information and instructions for execution by processor 314. In an example and referring to FIG. 1, storage device 322 is implemented to store and retrieve data associated with one or more of communication module 112, input/output module 114, user interface 116, tracking module 118, tracking sensor module 120, and/or content processing module 128. In an example, storage device 322 includes internal content data associated with insurance policies, contracts, legal reference materials and the like. In this example, storage device 322 is further configured to store the executable versions of communication module 112, input/output module 114, user interface 116, tracking module 118, tracking sensor module 120 and/or content processing module 128 for execution by processor 314 to control the associated componentry within system hardware 300. Examples of storage device 322 include magnetic and/or optical recording media, ferroelectric RAM (F-RAM) hard disks, solid-state drives, floppy disks, optical discs, and the like.

In some embodiments, interface 324 is implemented as a computer hardware component configured to allow user device 310 to communicate with other computing devices and/or systems through network connections. Examples of network connections include any suitable connections between computers, such as, for example intranets, local area networks (LANs), virtual private networks (VPNs), wide area networks (WANs), the Internet, and the like. Interface 324 can be implemented as any suitable interface, such as, network interface controllers, wireless network interface controllers, and the like.

In some embodiments, tracking sensor 326 is an eye-tracking sensor implemented as a computer hardware component configured to track the gaze of user 332. In these embodiments, eye-tracking sensor 326 can be implemented as an optical tracking device, such as an infrared emitter and camera, a video camera, and the like. In an example and referring to FIG. 1, eye-tracking sensor 326 is configured to be controlled by eye-tracking sensor module 120. Further to these embodiments, tracking sensor 326 is communicatively coupled to an expression sensor 328 implemented as a computer hardware component configured to determine one or more emotional states associated with user 332. In these embodiments, expression sensor 326 can be implemented as an optical tracking device, such as an infrared emitter and camera, a video camera, and the like. In an example and referring to FIG. 1, expression sensor 328 is configured to be controlled by expression sensor module 120. Further to these embodiments the tracking sensor 326 is a head-tracking sensor which is implemented as software configured to track the position of the user's head. In these embodiments, head-tracking-sensor 326 can be implemented as a physical tracking devices, such as an infrared emitter and camera, a video camera and the like. In an example and referring to FIG. 1, head-tracking sensor 326 is configured to be controlled by head-tracking sensor module 120.

In some embodiments, external data source 330 is implemented as a database including external content. In an example and referring to FIG. 1, external data source 330 is implemented in a manner substantially similar to external data source 132. In another example, external data source 330 is implemented as one or more of a server, authorized computing device, smartphone, desktop computer, laptop computer, tablet computer, PDA, another type of processor-controlled device that may receive, process, transmit digital data, and the like.

FIG. 4 is functional block diagram illustrating exemplary system hardware for presenting supplemental content to a user based on behavioral feedback, according to an embodiment.

In FIG. 4, system hardware 400 includes user device 410, external data source 430, user 432, and server 440. In FIG. 4, user device 410 further includes user device bus 412, processor 414, input/output device 416, user interface 418, memory 420, storage device 422, user device interface 424, and tracking sensor 426. In FIG. 4, server 440 further includes server bus 442, processor 444, input/output device 446, memory 448, storage device 450, and server interface 452. In some embodiments, system hardware 400 can include additional, fewer, or differently arranged components than those illustrated in FIG. 4.

In FIG. 4, user device 410 is electronically coupled to and in bi-directional communication with server 440, and server 440 is electronically coupled to and in bi-directional communication with external data source 430. In some embodiments, user device bus 412 is electronically coupled to and in bi-directional communication with processor 414, input/output device 416, memory 420, storage device 422, user device interface 424, and tracking sensor 426. In these embodiments, user interface 418 is rendered by input/output device 416. Further to these embodiments, user interface 418, and tracking sensor 426 are configured to interact with user 432 and receive behavioral information from the user 432. In these embodiments, user device bus 412 includes a path that allows components within user device 410 to communicate with each other. Yet further to these embodiments, server bus 442 is electronically coupled to and in bi-directional communication with processor 444, input/output device 446, memory 448, storage device 450, and server interface 452. In these embodiments, server bus 442 includes a path that allows components within server 440 to communicate with each other.

In some embodiments, processor 414 is implemented as computing hardware component including a central processing unit able to carry out instructions to perform one or more instructions associated with user device 410. In these embodiments, processor 414 can include a microprocessor, an application specific integrated circuit (ASIC), a field programmable object array (FPOA), and the like. Further to these embodiments, processor 414 interprets and executes instructions retrieved from memory 420 and storage Device 422. In an example and referring to FIG. 2, processor 414 is configured to interpret and execute instructions associated with the operation of user device communication module 212, input/output module 214, user interface 216, and tracking sensor module 218. In these embodiments, processor 444 is implemented as any computing hardware component including a central processing unit able to execute instructions to perform one or more actions associated with server 440. Still further to these embodiments, processor 444 can include a microprocessor, an application specific integrated circuit (ASIC), a field programmable object array (FPOA), and the like. In these embodiments, processor 444 interprets and executes instructions retrieved from memory 448 and storage device 450. In an example and referring to FIG. 2, processor 444 is configured to interpret and execute instructions associated with the operation of server communication module 242, tracking module 244 and content processing module 250.

In some embodiments, input/output device 416 is implemented as a computer hardware component that includes peripherals and/or other mechanisms that may enable a user to input information to user device 410, including keyboards, computer mice, buttons, touch screens, voice recognition, biometric mechanisms, and the like. In these embodiments, input/output device 416 may be further configured to include one or more mechanisms for outputting information to user 432, such as, for example displays, light emitting diodes (LEDs), printers, speakers, and the like. Further to these embodiments, input/output device 416 is implemented to include a computer hardware component able to output data to user 432 via textual and/or graphical content, such as RSVP text, images, videos, audio, and the like. In these embodiments, input/output device 416 is further configured to provide content by rendering the content onto user interface 418 and to receive input from user 432 via user interface 418. In an example and referring to FIG. 2, user interface 418 is implemented in a manner substantially similar to user interface 216. Still further to these embodiments, input/output device 446 is implemented as a computer hardware component that includes peripherals and/or other mechanisms that may enable a user to input information to server 440, including keyboards, computer mice, buttons, touch screens, voice recognition, biometric mechanisms, and the like. In these embodiments, input/output device 416 may be further configured to include one or more mechanisms for outputting information to user 432, such as, for example displays, light emitting diodes (LEDs), printers, speakers, and the like.

In some embodiments memory 420 is implemented as a computing hardware component that allows the storage and manipulation of data during operations carried out by processor 414. In an example and referring to FIG. 2, memory 420 allows the storage and manipulation of data during operations associated with user device communication module 212, input/output module 214, user interface 216, and tracking sensor module 218. In these embodiments, memory 448 is implemented as computer hardware component that allows the storage and manipulation of data during operations carried out by processor 444. In an example and referring to FIG. 2, memory 448 allows the storage and manipulation of data during operations associated with server communication module 242, tracking module 244, and/or content processing module 250. Examples of memory 420 and memory 448 include random access memory (RAM), read-only memory (ROM), flash memory, and the like.

In some embodiments, storage device 422 is implemented as a computer hardware component that allows the storage and retrieval of data associated with running one or more modules and executable versions of the one or more modules and is configured to store information and instructions for execution by processor 414 to control the associated componentry within user device 410. In an example and referring to FIG. 2, storage device 422 is implemented to store and retrieve data associated with one or more of user device communication module 212, input/output module 214, user interface 216, and tracking sensor module 218, for execution by processor 414 to control the associated componentry within system hardware 400. In these embodiments, storage device 450 is implemented as a computer hardware component that allows the storage and retrieval of data associated with running one or more modules and executable versions of the one or more modules and is configured to store information and instructions for execution by processor 444 to control the associated componentry within server 440. In an example and referring to FIG. 2, storage device 450 is implemented to store and retrieve data associated with one or more of server communication module 242, tracking module 244 and/or content processing module 250. Examples of storage device 422 and storage device 450 include magnetic and/or optical recording media, ferro-electric RAM (F-RAM) hard disks, solid-state drives, floppy disks, optical discs, and the like.

In other embodiments, user device interface 424 and server interface 452 are implemented as a computer hardware components configured to allow user device 410 and server 440 to communicate with other computing devices and/or systems through network connections. Examples of network connections include any suitable connections between computers, such as, for example intranets, local area networks (LANs), virtual private networks (VPNs), wide area networks (WANs), the Internet, and the like. User device interface 424 and server interface 452 can be implemented as any suitable interface, such as, network interface controllers, wireless network interface controllers, and the like.

In some embodiments, tracking sensor 426 is implemented as a computer hardware component configured to track the gaze of user 432. In these embodiments, the tracking sensor is an eye-tracking sensor 426 that can be implemented as an optical tracking device, such as an infrared emitter and camera, a video camera, and the like. In an example and referring to FIG. 2, eye-tracking sensor 426 is configured to be controlled by eye-tracking sensor module 218. Further to these embodiments, tracking sensor 426 is an expression sensor that is implemented as a computer hardware component configured to determine one or more emotional states associated with user 432. In these embodiments, expression sensor 426 can be implemented as an expression tracking device, such as an infrared emitter and camera, a video camera, and the like. In an example and referring to FIG. 2, expression sensor 426 is configured to be controlled by expression sensor module 218. Further to these embodiments the tracking sensor 426 is implemented as a computer hardware component configured to track the position of the user's head. In these embodiments, head-tracking-sensor 426 can be implemented as a physical tracking devices, such as an infrared emitter and camera, a video camera and the like. In an example and referring to FIG. 2, head-tracking sensor 426 is configured to be controlled by head-tracking sensor module 218.

In some embodiments, external data source 430 is implemented as a database including external content. In an example and referring to FIG. 2, external data source 430 is implemented in a manner substantially similar to external data source 232. In another example, external data source 430 is implemented as one or more of a server, authorized computing device, smartphone, desktop computer, laptop computer, tablet computer, PDA, another type of processor-controlled device that may receive, process, transmit digital data, and the like.

Figure 5:
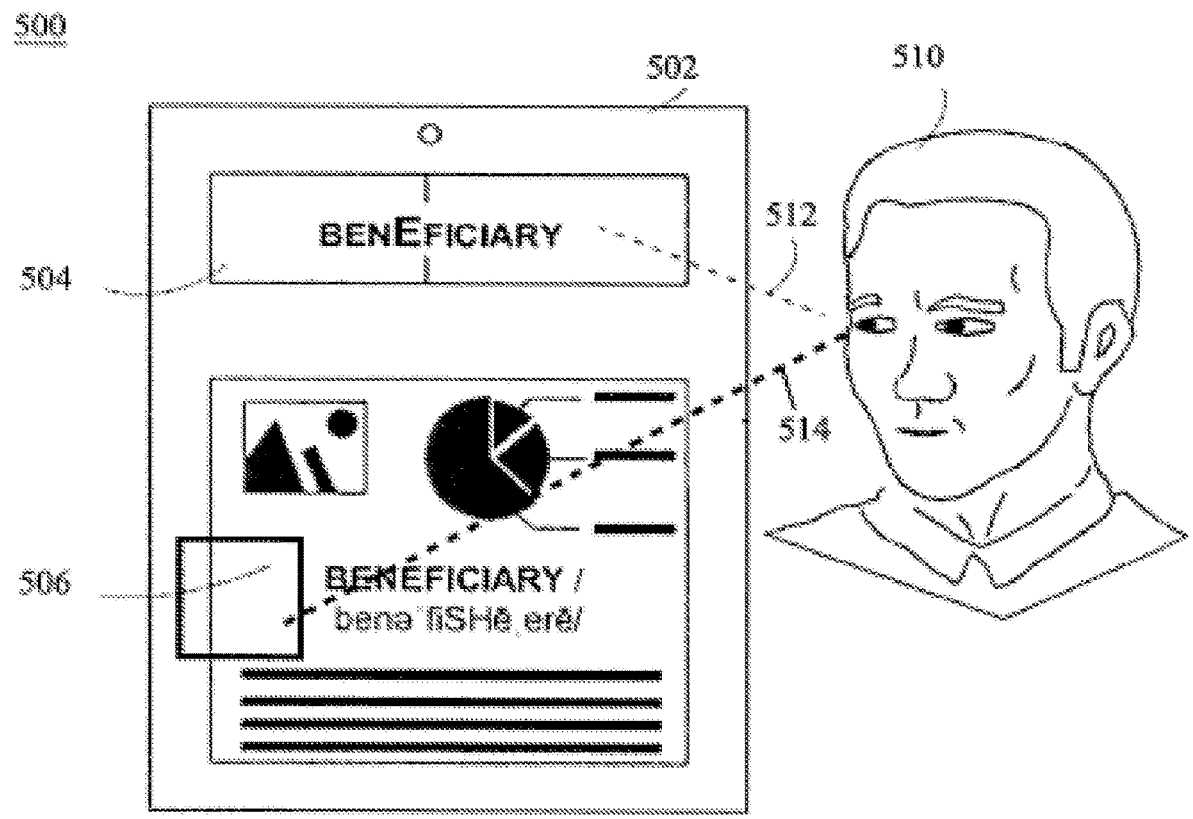
FIG. 5 illustrating an exemplary use case for presenting supplemental content to a user according to an embodiment.

FIG. 5 illustrating an exemplary use case for presenting supplemental content to a user based on behavioral feedback, according to an embodiment. In FIG. 5, use case 500 includes user device 502 and user 510. In FIG. 5, user device 502 includes content display 504 and supplemental content display 506 based on user behavioral feedback.

In some embodiments, the gaze of user 510 can be characterized by first gaze line 512 and second gaze line 514. Use case 500 can include additional, fewer, or differently arranged components than those illustrated in FIG. 5.

In some embodiments, user device 502 is implemented as a computing device configured to: generate content data configured for presentation on a display of a user computing device, transmit the content data to the display of the user computing device for display on the user computing device, collect by a tracking sensor module behavior data of the user sensed by the tracking sensor module, generate engagement data based on the collected behavior data, determine supplemental content configured for presentation on a display of the user computing device and display the supplemental content to the user on the user computing device.

In an example and referring to FIGS. 1 and 3, user device 502 is configured in a manner substantially similar to user device 110 and user device 310. In these embodiments, content display 504 is implemented on at least a first portion of a user interface associated with user device 502 and configured to display content. Further to these embodiments, supplemental content display 506 is implemented as a second portion of a user interface associated with user device 502 and is configured to display supplemental content associated with content being displayed by content display 504.

In operation, user device 502 displays content. In some embodiments, user device 502 monitors the behavior of user 510 in order to generate behavioral engagement data. In an example and referring to FIGS. 1 and 3, tracking sensor module 120 controls tracking sensor 118 and begins to track the movements of the user 130 in order to generate behavioral data, and provides the generated sensor data to tracking module 118. In some embodiments, user device 502 retrieves supplemental internal content data from a storage device (not shown) and supplemental external content data from an external data source (not shown), generates the supplemental content, and displays the supplemental content on the display 504 based on the behavioral data. Further to this embodiment, behavioral data is the gaze of user 510 which is characterized by first gaze line 512. Further to this embodiment, the supplemental content is relevant to the portion of the content within the first gaze line 512.

In an embodiment, the behavioral engagement data can be assigned a value, which can represent an amount of time that the user's gaze is directed toward an item or away from the user interface. For example, if the user is gazing an item for more than one second, the user may not understand the item. In another example, if the user is gazing away from the user interface for more than one second, the user may be bored or distracted. In the exemplary embodiment, this threshold value is set at one second, but any time period can be used. When the value is above this threshold value, the system can query for supplemental content that is related to the content being displayed when the user was gazing for a long period of time or gazing away. A fixation for reading text may be about 200 ms in duration, so a threshold value can be based upon this value, whereby a threshold can be established at about 500 ms, 1 second, or 2 seconds. When detecting whether a user's eyes are distracted away from the displayed content, a different threshold value can be used, which can be established at 1 second, 2 seconds, 3 seconds, or 4 seconds.

In another embodiment, behavioral data is expression data and the content processing module can assign a state of the user based upon the expression data. In this embodiment, state is associated with the content that was being displayed when the expression data was captured. The expression sensor data is analyzed to determine whether any micro-expressions are associated with a particular state, such as disgust, anger, fear, sadness, happiness, surprise, amusement, contempt, embarrassment, anxiety, guilt, pride, relief, contentment, pleasure, shame, confused, distracted, upset, or content. If the state is content, then the content processing module will continue to present the content or present the next portion of content. If the user is associated with another state, the content processing module will query for supplemental content to display to the user, where the supplemental content is associated with the content that was associated with the determined state and the content that was being displayed when the expression data was captured.

In some embodiments, user device 502 may then detect that user 510 looks away from the content display 504 and towards supplemental content display 506, as characterized by second gaze line 514. In these embodiments, the generated behavioral data is used by user device 502 to determine that the user wishes to view information supplemental to the text being displayed on display 504.

In some embodiments, user device 502 proceeds to pause the display of content on display 504, generate supplemental content, and display the supplemental content on supplemental content display 506. In these embodiments, as user 510 views content on display 504, user device 502 may analyze the generated emotional state data and detect that user 510 is feeling confused. Further to these embodiments, user device 502 may then proceed to pause the display of content on display 504, generate supplemental content, and display the supplemental content on supplemental content display 506.

In an example, user 510 is consuming content on a life insurance policy. In this example, the information is displayed to user 510 via display 504. As user 510 consumes the content, user device 502 observes user 510 and determines that user 510 is confused by a portion of the content that contains life insurance information. In this example, user device 502 then generates supplemental content for display on supplemental content display 506. Further to this example, the supplemental content includes information relevant to the portion of the content being displayed when the user state is detected, e.g. a definition for the term, other life insurance polices, cost of the policy and the like.

Figure 6A:
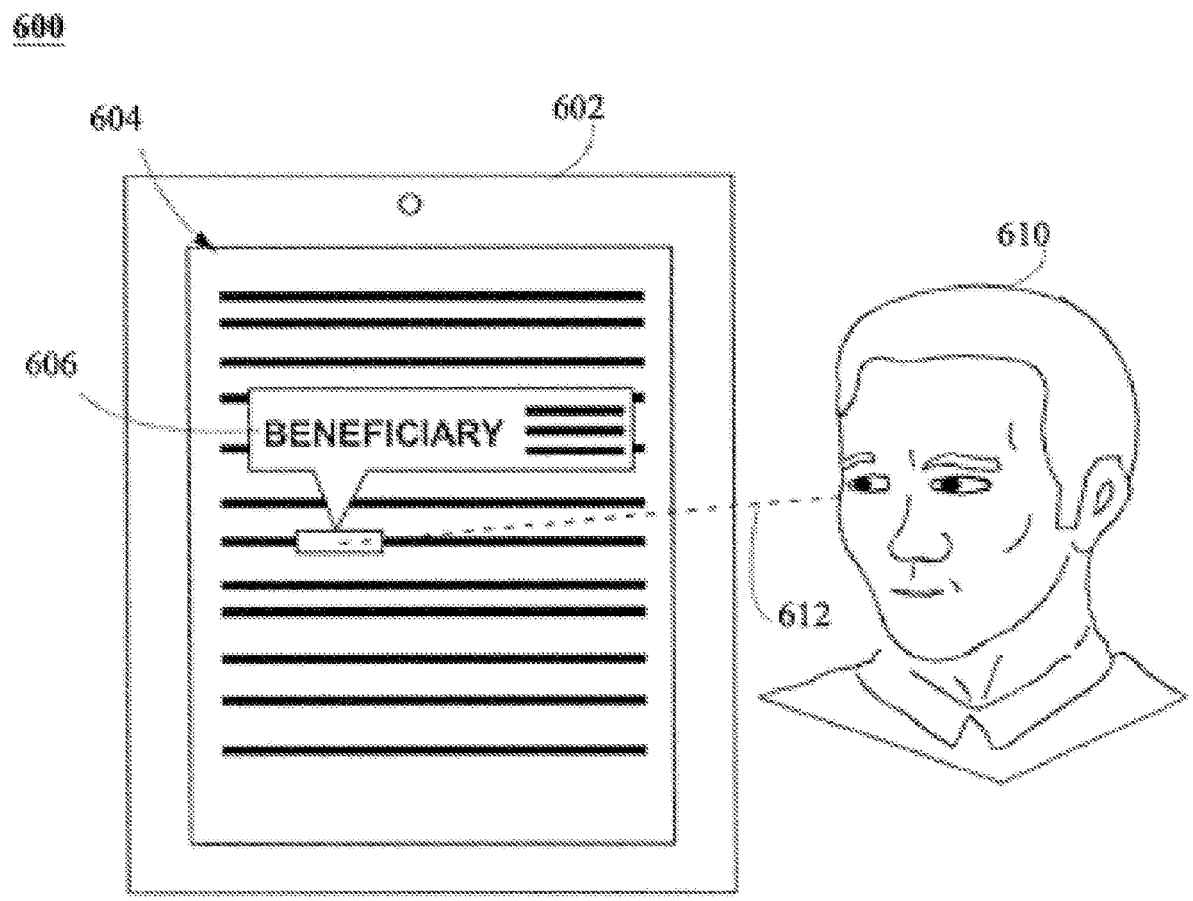
FIGS. 6A and 6B illustrate exemplary use cases for presenting supplemental content to a user according to another embodiment.
Figure 6B:
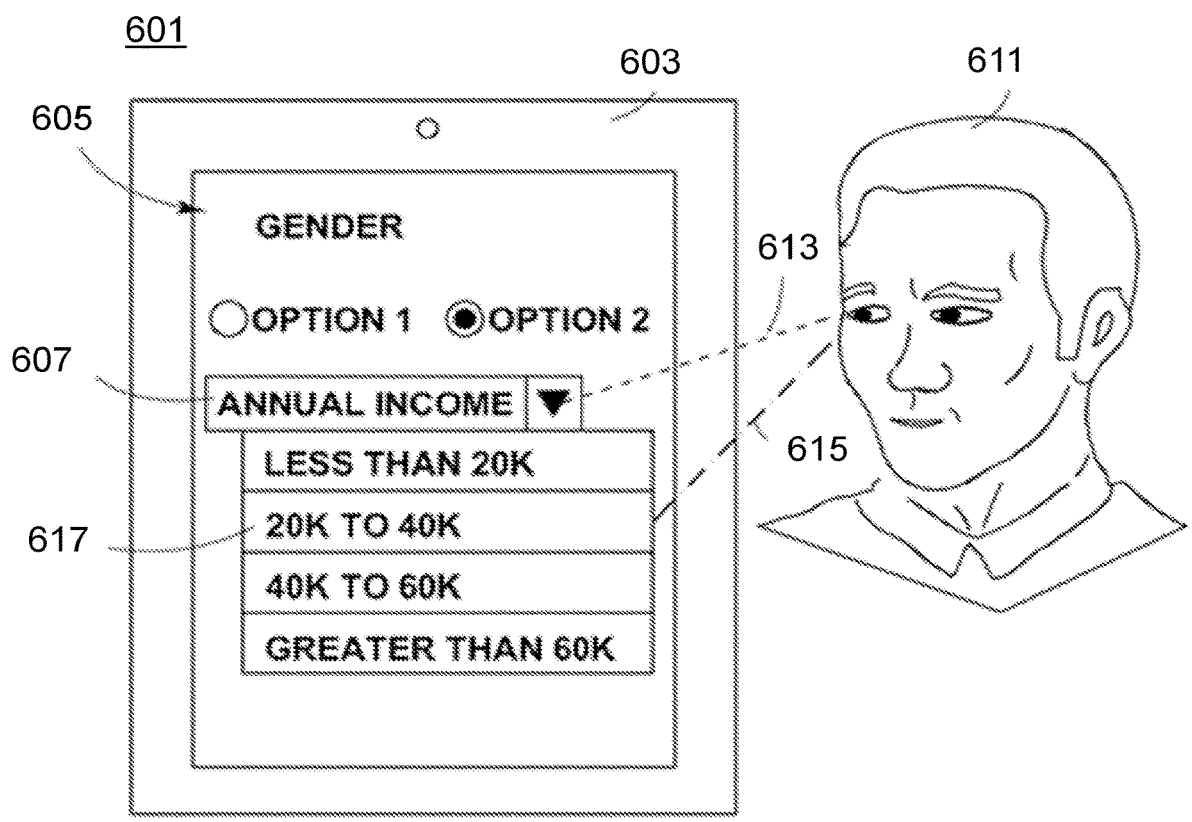

FIGS. 6A and 6B illustrate exemplary use cases for presenting supplemental content to a user based on behavioral feedback, according to another embodiment. In FIG. 6, use case 600 includes user device 602 and user 610. In FIG. 6A, user device 602 includes media display 604 and supplemental content pop-up 606. In FIG. 6A, the gaze of user 610 can be characterized by fixed gaze line 612. In other embodiments, use case 600 can include additional, fewer, or differently arranged components than those illustrated in FIG. 6A.

In some embodiments, user device 602 is implemented as a computing device configured to display said content to user 610, generate behavioral data based on the behavior of user 610 as the content is being displayed, to determine if supplemental content is needed based on the behavioral data, and to generate supplemental content based on external and/or internal supplementary data that is relevant to the content being displayed. In an example and referring to FIGS. 1 and 3, user device 602 is implemented to function in a manner substantially similar to user device 110 and user device 310. In other embodiments, media display 604 is implemented as a first portion of a user interface associated with user device 602. In yet other embodiments, supplemental content pop-up 606 is implemented as a second portion of a user interface associated with user device 602 and configured to display supplemental content associated with content being displayed by media display 604.

In operation, content is displayed on user device 602. User 610 proceeds to consume the content, and the gaze of user 610 is characterized by fixed gaze line 612. User device 602 then monitors the behavior of user 610 in order to generate behavioral engagement data. In an example and referring to FIGS. 1 and 3, tracking sensor module 120 is controlled by tracking module 118 and begins to track the movements of the of user 130 in order to generate behavioral sensor data, and provide the generated sensor data to tracking module 118. Further to this example, tracking module 118 processes the behavioral sensor data into behavioral engagement data.

In some embodiments, user device 602 may then detect that user 610 looks fixedly at a particular area displayed on media display 604, as characterized by fixed gaze line 612. In these embodiments, the generated behavioral engagement data is used by user device 602 to determine that the user wishes to view information supplemental to the text being displayed on media display 604. User device 602 proceeds to generate supplemental content and to display the supplemental content relevant to the content being displayed by media display 604 on supplemental content pop-up 606.

In FIG. 6B, use case 601 includes user device 603 and user 611. In FIG. 6B, user device 603 includes media display 605 and activatable content 607. In FIG. 6A, the gaze of user 611 can be characterized by fixed gaze line 613. In other embodiments, use case 601 can include additional, fewer, or differently arranged components than those illustrated in FIG. 6B.

In some embodiments, user device 603 is implemented as a computing device configured to display said content to user 611, generate behavioral data based on the behavior of user 611 as the content is being displayed, to determine if supplemental content is needed based on the behavioral data, and to generate supplemental content based on external and/or internal supplementary data that is relevant to the content being displayed. In an example and referring to FIGS. 1 and 3, user device 603 is implemented to function in a manner substantially similar to user device 110 and user device 310. In other embodiments, media display 605 is implemented as a first portion of a user interface associated with user device 603.

In operation, content is displayed on user device 603. User 611 proceeds to consume the content, and the gaze of user 611 is characterized by fixed gaze line 613. User device 603 then monitors the behavior of user 611 in order to generate behavioral engagement data. In an example and referring to FIGS. 1 and 3, tracking sensor module 120 is controlled by tracking module 118 and begins to track the movements of the of user 130 in order to generate behavioral sensor data, and provide the generated sensor data to tracking module 118. Further to this example, tracking module 118 processes the behavioral sensor data into behavioral engagement data.

In some embodiments, user device 603 may then detect that user 611 looks fixedly at a particular area displayed on media display 605, as characterized by fixed gaze line 613. In these embodiments, the generated behavioral engagement data is used by user device 603 to determine that the user wishes to view information supplemental to the text being displayed on media display 605. In this example, the user 611 is directing attention to activatable content 607. Activatable content may be a drop-down menu (as shown), a hyperlink, or other content that can change or present a new feature, such as content that can be clicked or activated with a mouse or cursor. Upon detecting fixed gaze line 613 at the activatable content 607, the activatable content 607 is activated. In this example, the activatable content 607 presents a drop-down menu 617 when activated. Upon detecting a fixed gaze line 615 at the drop-down menu 617, the item on the drop-down menu associated with the fixed gaze line can be activated (e.g., selected from a drop-down menu).

Figure 7:
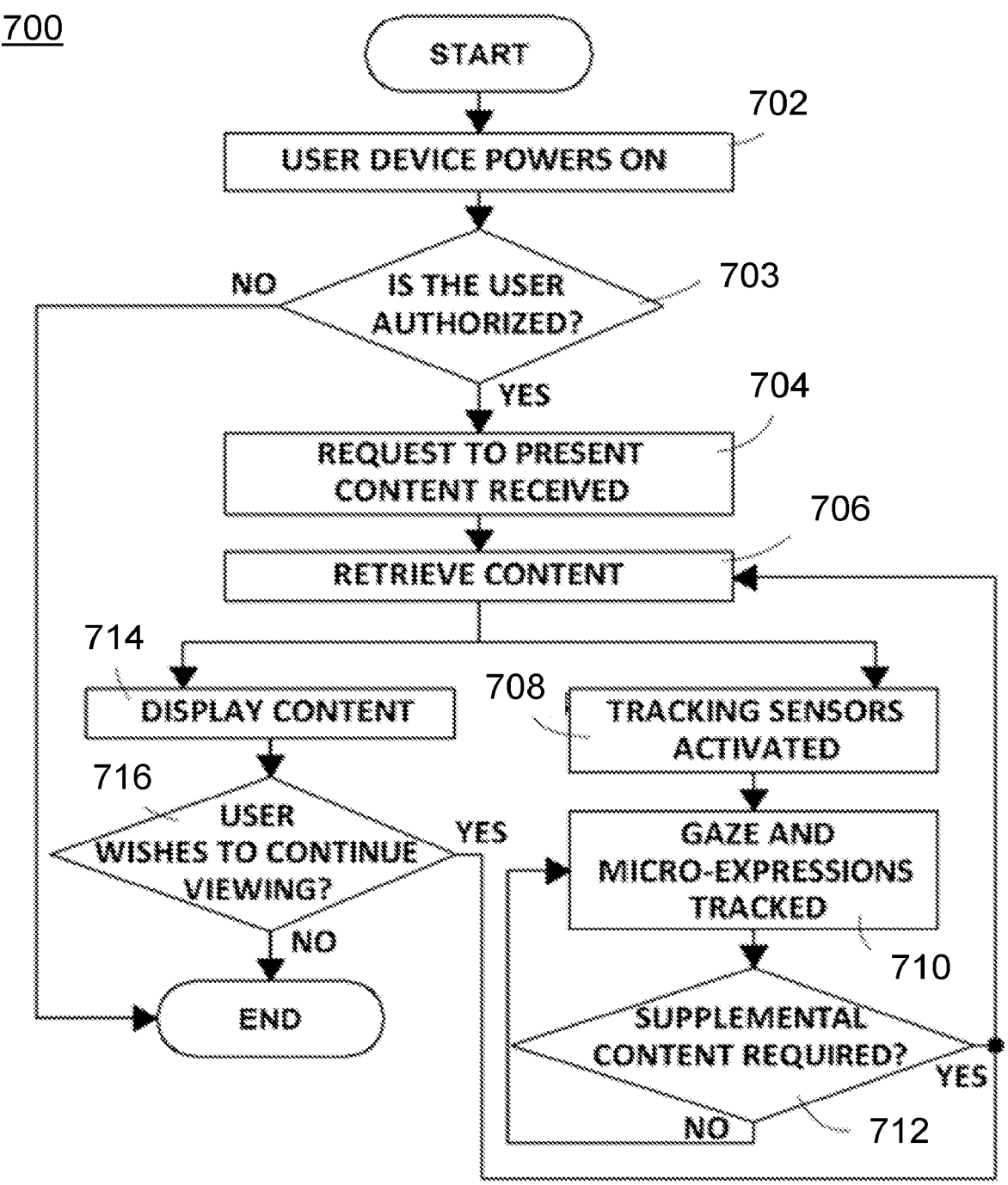
FIG. 7 is a flow chart of an exemplary method for presenting supplemental content to a user based on according to an embodiment.

FIG. 7 is a flow chart of an exemplary method for presenting supplemental content to a user based on behavioral feedback, according to an embodiment. In some embodiments, said method may be executed in system hardware and software architectures similar to those described in FIGS. 1-6, above.

In FIG. 7, process 700 begins at step 702. At step 702, a user powers a user device on. In an example and referring to FIGS. 1 and 3, user 130 powers on user device 110. In an example, user device 110 is powered on when user 130 inputs a command via an input/output device. In some embodiments, the user device loads a content processing module, a communication module, an input/output module, and a tracking module from the user device memory into the user device processor, which instructs the device processor to execute the method described herein. Process 700 proceeds to step 703.

At step 703, the user device can determine if the user is authorized via an authentication module 126 executed by a processor on the user device. The authentication module of the user device may communicate with the external data source to authorize the user, or the authentication module 126 can authorize the user locally on the user device. Process 700 proceeds to step 704.

At step 704, upon receiving a request to present content received, the input/output module is loaded into memory by the processor and instructs the processor to execute instructions to display content. Process 700 then proceeds to step 706.

At step 706, the content processing module is loaded into memory by the processor and instructs the processor to execute instructions to provide command data to the communications module to retrieve content data from an internal and/or external data source. The communications module then instructs the user device processor to provide query data to the internal and/or external data source via the user device. The internal and/or external data source receives the query data, processes it, and returns result data to the communications module. The communications module then carries out instructions on the user device processor in order to process the result data and provide the content data to the communications module. The communications module then carries out instructions on the user device processor to display the content. Process 700 then proceeds to step 708.

At step 708, the content processing module is loaded into memory by the processor and instructs the processor to execute instructions to send command data to the tracking module including instructions to activate the tracking. At this step, the processor carries out instructions to prepare the user device to track the behavior of the user, such as for example the head movement, gaze and/or micro expressions of the user. Process 700 continues to step 710.

At step 710, the tracking module uses behavioral sensor data from the tracking sensor (e.g., images, gaze path curves, micro expressions, head movement, head position and the like) to determine the level of behavioral engagement and/or emotional state of the user has with the content being displayed by the user device. The processing module then provides the behavioral engagement and/or emotional state data to the content processing module. Process 700 continues to step 7012.

At step 712, the content processing module is loaded into memory by the processor and instructs the processor to execute instructions to process the behavioral engagement data and/or the emotional state data to determine if supplemental content is required. At this step, the content processing module determines if the behavioral engagement data of the user indicates that the user is focusing his or her gaze on the content, or whether they have looked away or shown some other indicator of disengagement from the content. If the content processing module determines the user has disengaged with the content, the content processing module may pause the display of content on the user device and generate command data to retrieve supplemental data associated with the content being displayed on the user device. If the command processing module determines that supplemental content is required, process 700 proceeds to step 706. Otherwise, process 700 proceeds to step 710.

At step 716, the user decides if they want to continue to view content, if the user continues to view content the process 700 proceeds to step 716. If the user decides they do not want to continue to view content, the process 700 ends.

In the instant application, the inventors have improved over previous content providing systems by dynamically providing supplemental content based on user behavior. In particular, using the tracking sensor module and/or the tracking module, the system can continuously and automatically monitor the behavior of a user consuming a content data to ascertain whether the user is ready for supplemental content data. Only when the user's behavior indicates a need for supplemental content data, the invention gathers the supplemental content data from the internal and/or external source and modifies the display to show the supplemental content data. When the user's behavior shows no supplemental data is being requested, the displayed content data remains unchanged. The process is performed by using tracking sensor modules and tracking modules that collect behavior data based on any one or more of user's head movement, expressions, eye movement, and gesture, generate an engagement data based on the collected behavior data and translating such gesture data into instructions that reflect whether supplemental content data is being requested. In so doing, by permitting supplemental content data to be dynamically provided in response to a user's behavior, the system's ability to display information and interact with the user are improved.

Moreover, by only supplying supplemental data based on user's behavior, the system described herein is able to efficiently provide the requested information seamlessly to the user allowing a more efficient way to consume the content data and supplemental content data from the user's perspective as well as from a computing standpoint. The user can be more efficient by not having to enter commands or seek supplemental content data other than by looking at the display and making a simple head or eye movement, other gesture, or simply change expressions. From a computing perspective, the system is more efficient in that it limits the use of memory and information transfer and processing to only what the user is able to consume, thus avoiding processing or transferring unnecessary information prematurely.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method comprising:
   displaying, by a server on a graphical user interface, content data corresponding to a set of media elements corresponding to a set of text where each media element is sequentially displayed for a predetermined amount of time before a next media element is displayed, the predetermined amount of time corresponding to a speed of display of at least a portion of the set of media elements;
   activating, by the server, a head-tracking sensor configured to track head movements of a user viewing the graphical user interface; and
   in response to receiving an indication from the head-tracking sensor that the user has head movement in a direction outside a boundary associated with the graphical user interface displaying at least one media element for longer than a threshold, causing, by the server, the graphical user interface to modify the predetermined amount of time before the next media element is displayed, such that the display of the set of media elements is paused, wherein when the server receives an indication that the user's head movement is in a direction inside of the boundary associated with the graphical user interface, the server resumes the display of the set of media elements.

2. The method of claim 1, wherein when the server receives an indication that the user's head movement is in a direction inside of the boundary associated with the graphical user interface, the server resumes the display of the set of media elements in accordance with the predetermined amount of time.

3. The method of claim 1, further comprising:
   generating, by the server, supplemental content data associated with a media element displayed on the graphical user interface when the user's head movement is detected to move in the direction outside the boundary associated with the graphical user interface; and
   displaying, by the server, the supplemental content data.

4. The method of claim 3, wherein the set of media elements are displayed in a first portion of the graphical user interface and the supplemental content data is displayed in a second portion of the graphical user interface.

5. The method of claim 1, further comprising:
   changing, by the server, at least one media element displayed on the graphical user interface.

6. The method of claim 1, further comprising:
   changing, by the server, a layout or a text size of the content data.

7. A computer system:
   an electronic device configured to display a graphical user interface;
   a head-tracking sensor in communication configured to monitor head movement of a user operating the electronic device;
   a server in communication with the electronic device and the head-tracking sensor, the server configured to:
   display, on the graphical user interface, content data corresponding to a set of media elements corresponding to a set of text where each media element is sequentially displayed for a predetermined amount of time before a next media element is displayed, the predetermined amount of time corresponding to a speed of display of at least a portion of the set of media elements;
   activate the head-tracking sensor to monitor the user's head movements; and
   in response to receiving an indication from the head-tracking sensor that the user has head movement in a direction outside a boundary associated with the graphical user interface for longer than a threshold, cause the graphical user interface to modify the predetermined amount of time before the set of media element is displayed, such that the display of the set of media elements is paused, wherein when the server receives an indication that the user's head movement is in a direction inside of the boundary associated with the graphical user interface, the server is configured to resume the display of the set of media elements.

8. The system of claim 7, wherein when the server is configured to receive an indication that the user's head movement is in a direction inside of the boundary associated with the graphical user interface, the server is configured to resume the display of the set of media elements in accordance with the predetermined amount of time.

9. The system of claim 7, wherein the server is further configured to:
   generate supplemental content data associated with a media element displayed on the graphical user interface when the user's head movement is detected to move in the direction outside the boundary associated with the graphical user interface; and
   displaying, by the server, the supplemental content data.

10. The system of claim 9, wherein the set of media elements are displayed in a first portion of the graphical user interface and the supplemental content data is displayed in a second portion of the graphical user interface.

11. The system of claim 7, wherein the server is further configured to:
   change at least one media element displayed on the graphical user interface.

12. The system of claim 7, wherein the server is further configured to:
   change a layout or a text size of the content data.

* * * * *